(12) United States Patent
Nakamura et al.

(10) Patent No.: US 7,971,462 B2
(45) Date of Patent: *Jul. 5, 2011

(54) CABLE HANGER PRODUCTION SYSTEM AND PRODUCTION METHOD

(75) Inventors: Minoru Nakamura, Omitama (JP); Hiroshi Iwase, Ibaraki-Machi (JP)

(73) Assignee: Kyoei High Opt Co., Ltd., Tokyo (JP)

( * ) Notice: Subject to any disclaimer, the term of this patent is extended or adjusted under 35 U.S.C. 154(b) by 582 days.

This patent is subject to a terminal disclaimer.

(21) Appl. No.: 12/106,897

(22) Filed: Apr. 21, 2008

(65) Prior Publication Data

US 2008/0257444 A1   Oct. 23, 2008

(30) Foreign Application Priority Data

Apr. 23, 2007   (JP) .................. P2007-113484

(51) Int. Cl.
*B21D 11/00* (2006.01)
*B21F 7/00* (2006.01)
(52) U.S. Cl. ............... 72/66; 72/138; 72/141; 140/71 C; 140/102; 140/149
(58) Field of Classification Search ............ 72/66, 135, 72/141, 142, 143, 144, 145, 371, 64, 65, 72/138, 139; 470/103, 124, 149; 140/103, 140/124, 149, 71 C, 86, 92.1, 92.2, 102
See application file for complete search history.

(56) References Cited

U.S. PATENT DOCUMENTS

| | | | | |
|---|---|---|---|---|
| 1,336,388 A | * | 4/1920 | Youngberg | 72/475 |
| 3,322,164 A | * | 5/1967 | Lindsay | 140/71.5 |
| 3,650,141 A | * | 3/1972 | Pepe | 72/332 |
| 3,707,170 A | * | 12/1972 | Mazuir et al. | 138/154 |
| 3,896,860 A | * | 7/1975 | Iannucci | 140/149 |
| 4,408,639 A | * | 10/1983 | Hayama et al. | 140/71.5 |
| 5,274,907 A | * | 1/1994 | Moorehead | 29/736 |
| 5,727,777 A | | 3/1998 | Chikiri | |

FOREIGN PATENT DOCUMENTS

| | | |
|---|---|---|
| JP | 58-013425 A | 1/1983 |
| JP | 3-18205 A | 1/1991 |
| JP | 6-65879 A | 3/1994 |
| JP | 2002-66678 A | 3/2002 |
| JP | 2005-168284 A | 6/2005 |

OTHER PUBLICATIONS

Chinese Office Action issued in Chinese Application No. 200810095419.4 dated Jun. 12, 2010 (6 pages).

* cited by examiner

*Primary Examiner* — Edward Tolan
(74) *Attorney, Agent, or Firm* — Sughrue Mion, PLLC

(57) ABSTRACT

A system and method for producing a cable hanger formed by alternately and continuously forming the Z-winding spiral and the S-winding spiral using the hanger wire. The system and method involve the use of at least five spiral forming dice accommodated in a cylindrical space of the housing such that the spiral forming dice are adjacent to each other and can rotate independently from one another.

28 Claims, 24 Drawing Sheets

CABLE HANGER PRODUCTION SYSTEM AND PRODUCTION METHOD

CROSS-REFERENCE TO RELATED APPLICATION

This application is based upon and claims the benefit of priority from the prior Japanese Patent Application No. 2007-113484, filed in Japan on Apr. 23, 2007, and the entire contents of which are incorporated herein by reference.

BACKGROUND OF THE INVENTION

1. Field of the Invention

The present invention relates to a production system and a production method of a cable hanger used for bundling optical fiber cables such as optical collecting drop cables or wires such as various cables into one between electric poles.

2. Description of the Related Art

Conventionally, a cable hanger is used for bundling wires such as optical fiber cables into one between electric poles. As a cable hanger of this kind, there is one called spiral hanger formed into a spiral shape (for example, see U.S. Pat. No. 5,727,777).

The cable hanger that is called spiral hanger is formed by winding a hanger wire into a coil shape in a constant direction. When a hung wire is extended between electric poles, one end of the cable hanger imports an end of the hung wire therein, the cable hanger is kept rotating in one direction along the spiral shape, the hung wire is taken therein and with this, the cable hanger is supported.

As the spiral cable hanger, there is proposed a cable hanger having largely enhanced operability.

This cable hanger is formed by alternately and continuously forming a Z-winding spiral and an S-winding spiral along an axis via a switching part instead of forming a spiral shape into a constant direction (see Japanese Patent Application Laid-open No. 2005-168284).

Therefore, when a hung wire is extended between electric poles, the cable hanger is disposed along the hung wire and then, any of switching parts of the cable hanger imports the hung wire therein, and it is kept rotating in one direction (e.g., rotated leftward) until it reaches a next switching part as it is. If it reaches the next switching part, the switching part imports the hung wire therein, and it is kept rotating in one direction (e.g., rotated rightward) until it reaches the next switching part as it is. By carrying out such a taking-in operation over the entire length of the hung wire, the hung wire can be taken in the cable hanger swiftly.

However, because the cable hanger must be formed by alternately and continuously forming the Z-winding spiral and the S-winding spiral using the hanger wire, a production system suitable for this has not yet been proposed.

SUMMARY OF THE INVENTION

In order to solve the above problems, an object of the present invention is to provide a production system and a production method of a cable hanger capable of alternately and continuously forming the Z-winding spiral and the S-winding spiral using a hanger wire.

To achieve the above object, a first aspect of the present invention provides a cable hanger production system in which a Z-winding spiral and an S-winding spiral are alternately and continuously formed along an axis via a switching part. A hanger wire is supplied from one end of a housing and sent out from the other end thereof. At least five spiral forming dice are accommodated in a cylindrical space of the housing such that the spiral forming dice are adjacent to each other and can rotate independently from one another. Each of second and subsequent spiral forming dice as counted from the hanger wire supplying end of the housing includes a bottom face forming a shape corresponding to a curvature of the spiral on a plane intersecting with the axis at right angles between inner peripheral face of the housing and the bottom face, and the bottom face gradually becoming narrower from both sides of the spiral forming die in its longitudinal direction toward a central portion thereof, a Z-winding wall face forming a shape corresponding to a pitch of the Z-winding spiral and an S-winding wall face forming a shape corresponding to a pitch of the S-winding spiral, which are inclined with respect to the plane and the axis. The Z-winding wall face and the S-winding wall face intersect with each other at a central intersection of the spiral forming die in the longitudinal direction thereof, and extend along a side edge of the bottom face. The first spiral forming die as counted from the hanger wire supplying end of the housing has a latter half thereof in its longitudinal direction, the latter half includes the bottom face, the Z-winding wall face and the S-winding wall face in the same as those of latter halves of the second and subsequent spiral forming dice in the longitudinal direction. The first spiral forming die also has a first half including an introducing portion extending along the axis, the introducing portion is connected to a front portion of the intersection in the bottom face of the latter half in the longitudinal direction, and a front end of the introducing portion includes a hanger wire introducing inlet.

A second aspect of the present invention provides a cable hanger production system in which a Z-winding spiral and an S-winding spiral are alternately and continuously formed along an axis via a switching part. The production system comprises a wire processing device including a housing having a cylindrical space in which a hanger wire is supplied from one end of the housing and sent out from the other end thereof, and at least five spiral forming dice which are accommodated in the cylindrical space of the housing in adjacent to one another such that the spiral forming dice can be rotated by a motor independently from each other; and a wire supply device which is disposed in front of the wire processing device for supplying the hanger wire toward the one end of the wire processing device. The spiral forming dice are positioned by shifting from positions for forming the Z-winding spiral or S-winding spiral to positions for forming the S-winding spiral or Z-winding spiral by simultaneously rotating second and subsequent spiral forming dice with respect to the first spiral forming die as a reference as counted from the one end of the wire processing device, and by stopping the spiral forming dice from a front side. Rotation velocities of the spiral forming dice by the motor are set to such a value that the each spiral forming die rotates through a rotation angle required for shifting from the forming position of the Z-winding spiral or S-winding spiral to the forming position of the S-winding spiral or Z-winding spiral while the hanger wire supplied by the wire supply device moves from a front end to a rear end of the spiral forming dice.

A third aspect of the present invention provides a production method for forming a cable hanger in which a Z-winding spiral and an S-winding spiral are alternately and continuously formed along an axis via a switching part, wherein a hanger wire is supplied from one end of a housing and sent out from the other end thereof, at least five spiral forming dice are accommodated in a cylindrical space of the housing such that the spiral forming dice are adjacent to each other and they can rotate independently from each other, the spiral forming dice are used. Each of second and subsequent spiral forming dice as counted from the hanger wire supplying end of the housing includes a bottom face forming a shape corresponding to a curvature of the spiral on a plane intersecting with the axis at right angles between inner peripheral face of the housing and the bottom face, and the bottom face gradually becoming narrower from both sides of the spiral forming die in its longitudinal direction toward a central portion thereof, a Z-winding wall face forming a shape corresponding to a pitch of the Z-winding spiral and an S-winding wall face forming a shape corresponding to a pitch of the S-winding spiral, which are inclined with respect to the plane and the axis, the Z-winding wall face and the S-winding wall face intersect with each other at a central intersection of the spiral forming die in the longitudinal direction thereof, and extend along a side edge of the bottom face. The first spiral forming die as counted from the hanger wire supplying end of the housing has a latter half thereof in its longitudinal direction, the latter half includes the bottom face, the Z-winding wall face and the S-winding wall face in the same as those of latter halves of the second and subsequent spiral forming dice in the longitudinal direction, the first spiral forming die also has a first half including an introducing portion extending along the axis, the introducing portion is connected to a front portion of the intersection in the bottom face of the latter half in the longitudinal direction, and a front end of the introducing portion includes a hanger wire introducing inlet. In the method: after a first step of inserting the hanger wire along the intersections into the spiral forming dice positioned at locations where the intersections are arranged along the axial direction is performed, the hanger wire is supplied from the one end and in this state; and second to fifth steps are repeated by predetermined times; the second step of positioning the spiral forming dice at locations where the Z-winding wall faces or the S-winding wall faces are sequentially connected to each other; the third step of keeping the spiral forming dice in their positioned state and for forming the Z-winding spiral or the S-winding spiral having a predetermined number of windings; the fourth step of position shifting the spiral forming dice to locations where the S-winding wall faces or the Z-winding wall faces are sequentially connected to each other; and the fifth step of keeping the spiral forming dice in their positioned state and for forming the S-winding spiral or the Z-winding spiral having a predetermined number of windings.

BRIEF DESCRIPTION OF THE ACCOMPANYING DRAWINGS

These and other objects and the configuration of this invention will become clearer from the following description of the preferred embodiments, read in connection with the accompanying drawings in which:

FIG. 1 is a schematic plan view showing the entire structure of a cable hanger production system according to the present invention;

FIGS. 2A, 2B, and 2C are schematic perspective views of spiral forming dice which is combined as a wire processing device, and are explanatory diagrams (part 1) sequentially showing rotating position of spiral forming dice when a Z-winding spiral is formed;

FIGS. 3D, 3E, and 3F are schematic perspective views of spiral forming dice which is combined as a wire processing device, and are explanatory diagrams (part 2) continued from FIGS. 2A, 2B, and 2C;

DETAILED DESCRIPTION OF THE INVENTION

Figure 1:
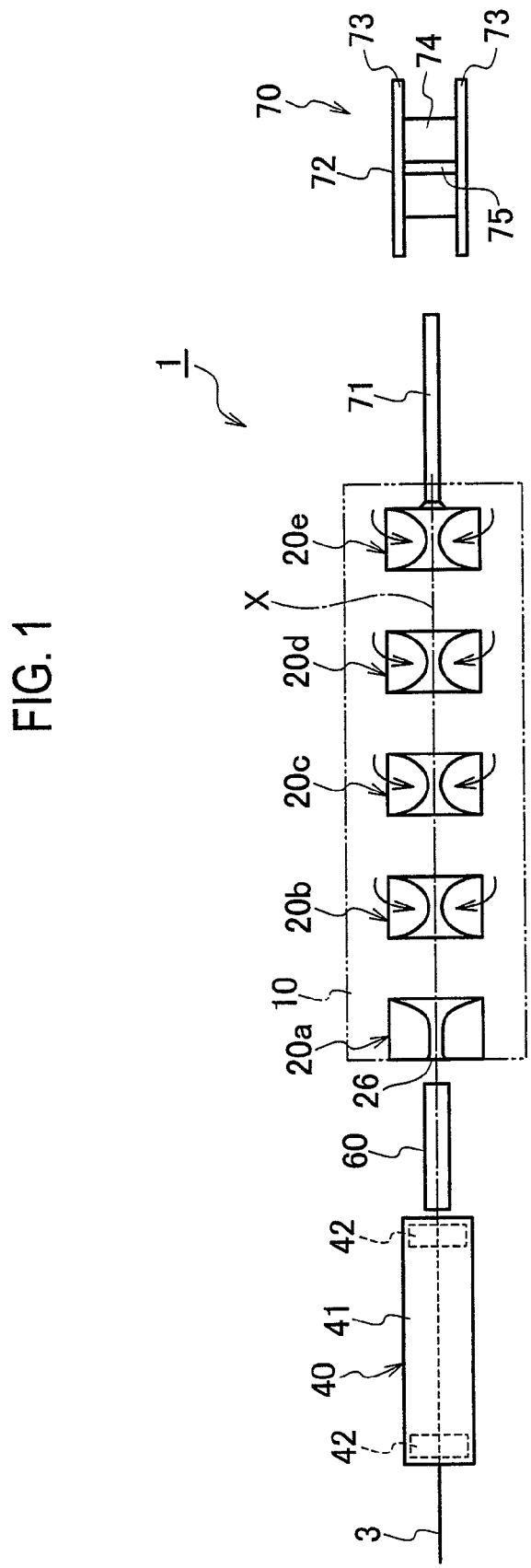
Figure 2A:
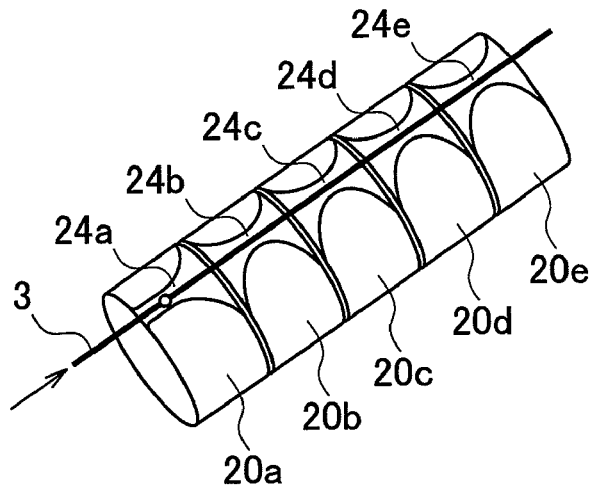
Figure 2B:
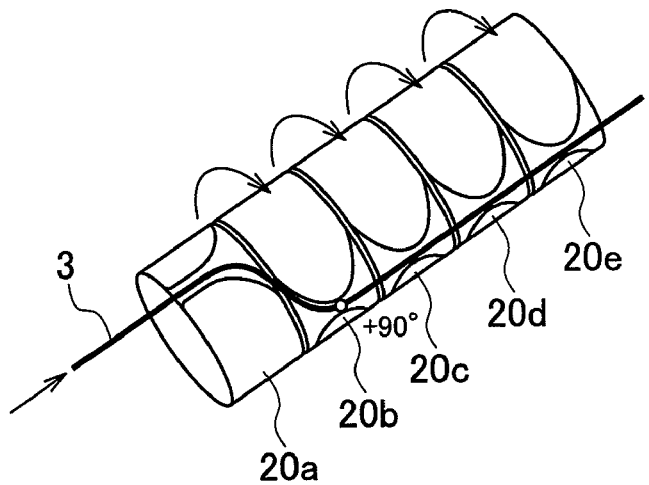
Figure 2C:
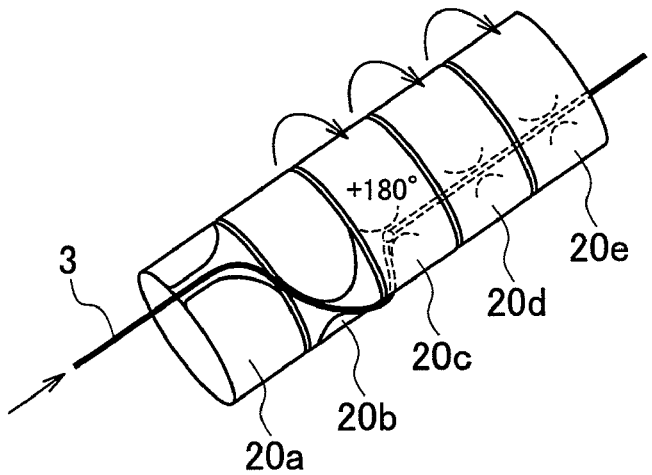
Figure 3D:
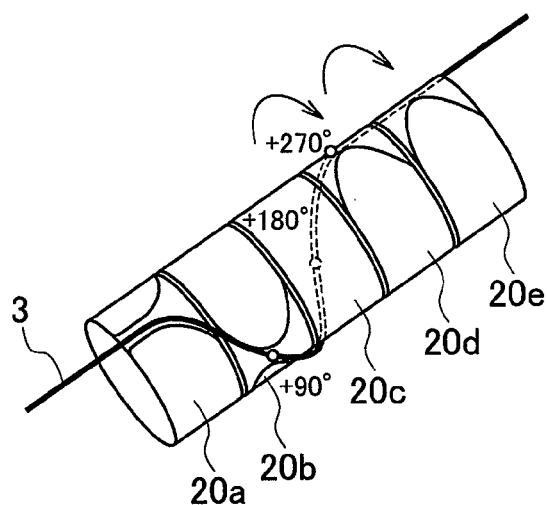
Figure 3E:
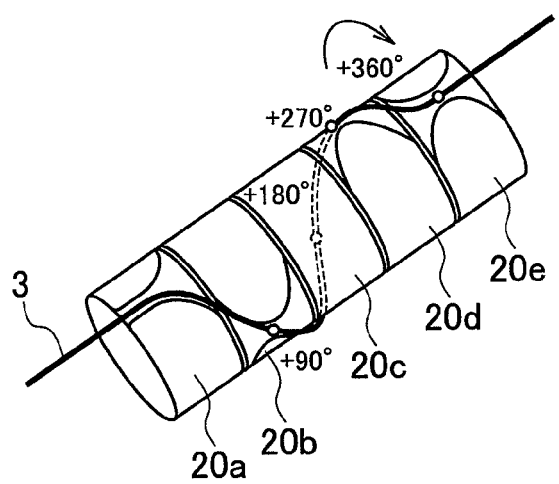
Figure 3F:
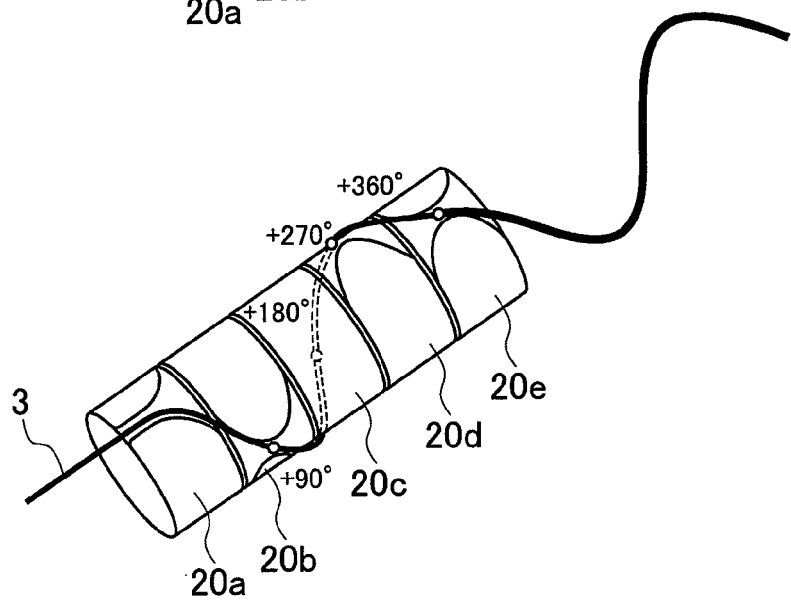
Figure 4:
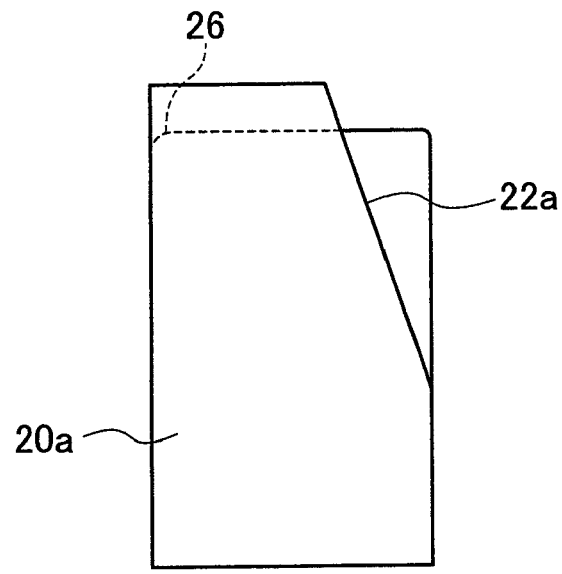
FIG. 4 is a front view of a stationary spiral forming die.
Figure 5:
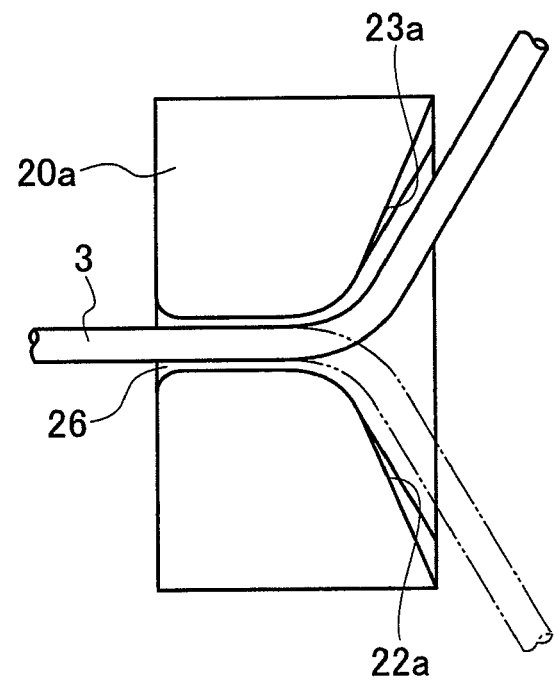
FIG. 5 is a plan view of the stationary spiral forming die.

FIG. 1 is a schematic plan view showing the entire structure of a cable hanger production system according to the present invention. The cable hanger production system 1 produces a cable hanger in which a Z-winding spiral and an S-winding spiral are alternately and continuously formed via a switching part along an axis.

The cable hanger production system 1 includes a wire supply device 40 and a wire processing device 10 disposed along a sending-out direction of a hanger wire 3 in this order from the front side. A cable hanger 5 which is processed and completed by the wire processing device 10 is reeled up around a winder device (winder drum) 72.

An outline of a spiral forming operation carried out by the wire processing device 10 will be explained with reference to FIGS. 2A to 16D.

Figure 6A:
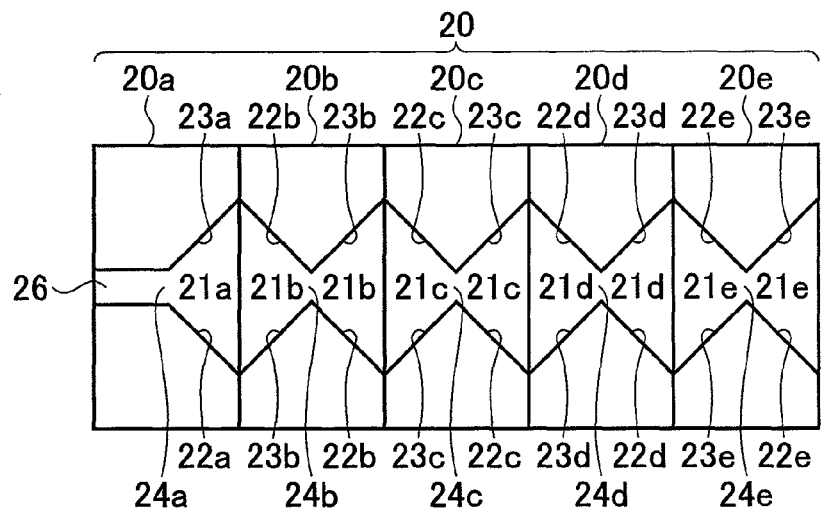
FIGS. 6A to 6D are a schematic plan view, a schematic front view, a schematic bottom view and a schematic rear view of spiral forming dice combined as a wire processing device, and show positions of the spiral forming dice when passing through a hanger wire.
Figure 6B:
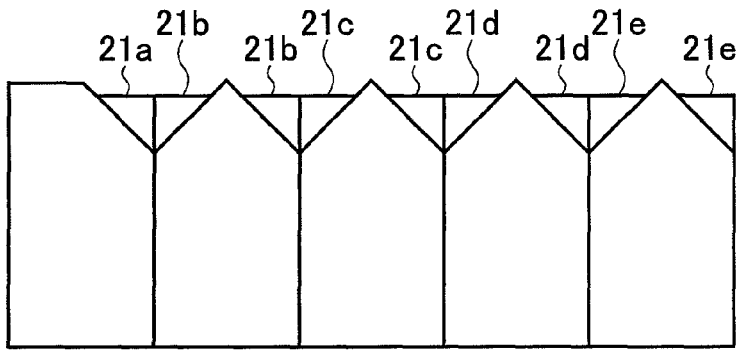
Figure 6C:
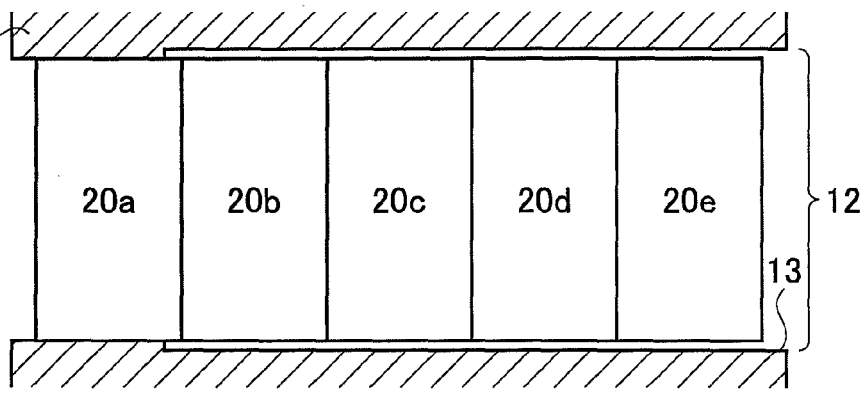
Figure 6D:
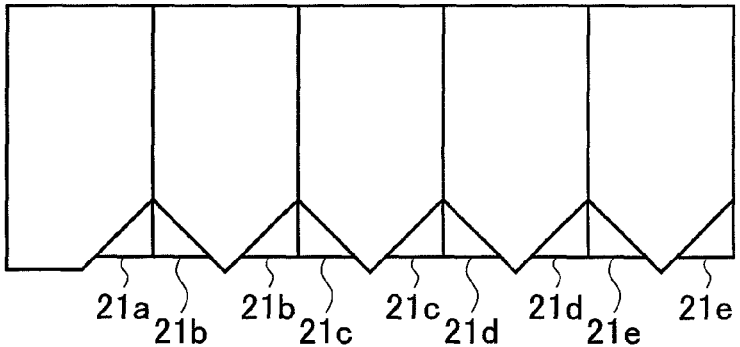
Figure 7A:
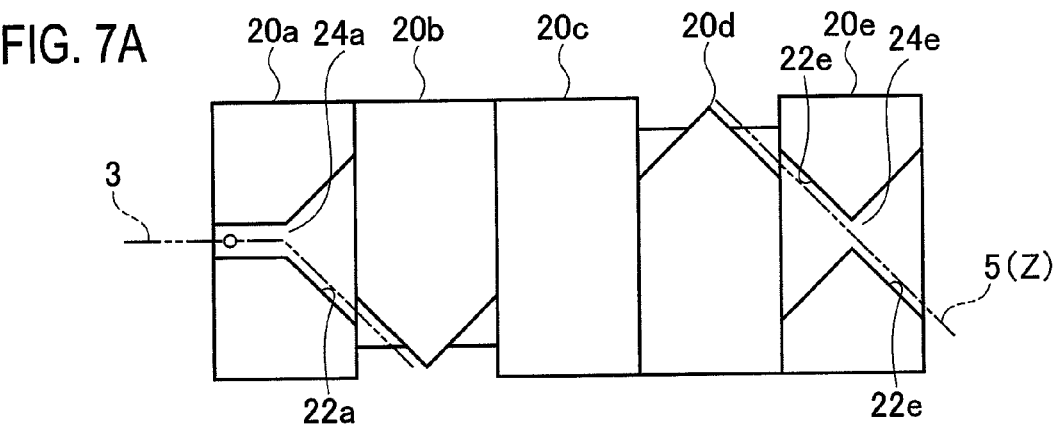
FIGS. 7A to 7D are a schematic plan view, a schematic front view, a schematic bottom view and a schematic rear view of the spiral forming dice combined as the wire processing device, and show positions of the spiral forming dice when forming a Z-winding spiral.
Figure 7B:
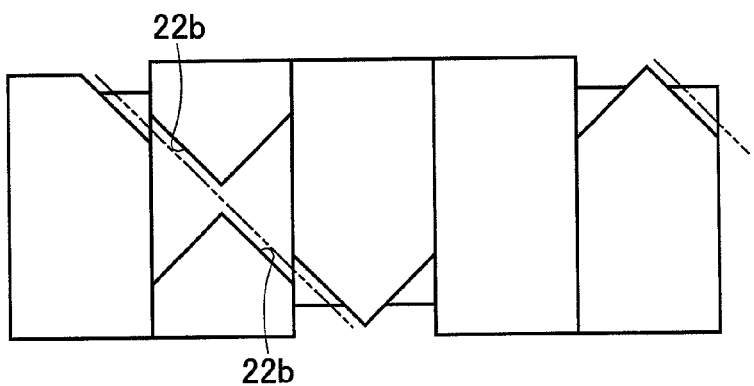
Figure 7C:
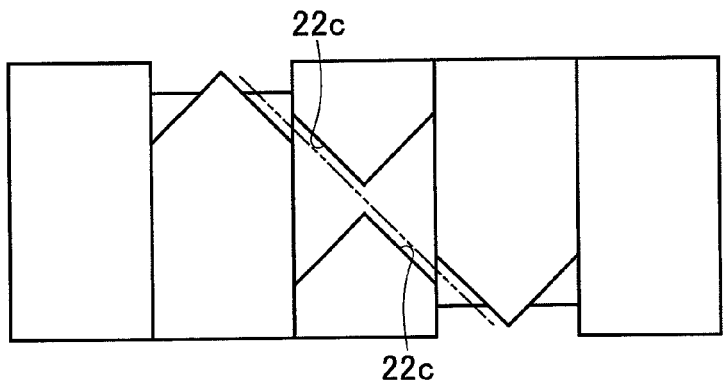
Figure 7D:
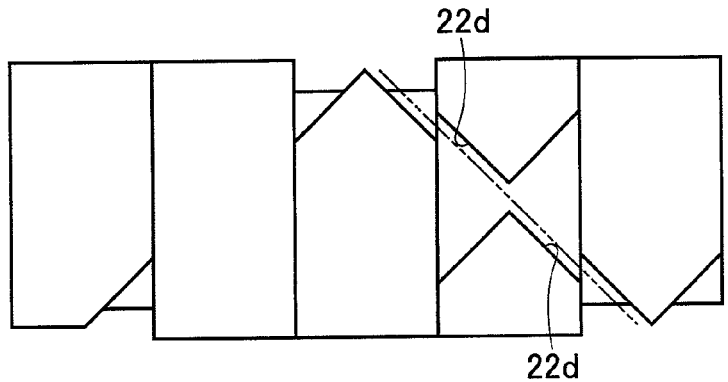
Figure 8A:
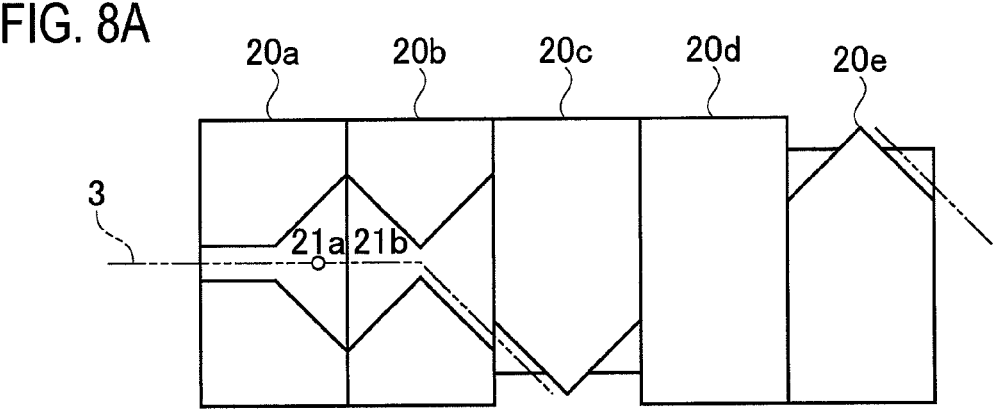
FIGS. 8A to 8D are a schematic plan view, a schematic front view, a schematic bottom view and a schematic rear view of the spiral forming dice combined as the wire processing device, and show positions of the spiral forming dice rotated from the positions shown in FIGS. 7A to 7D through 90° for forming an S-winding spiral.
Figure 8B:
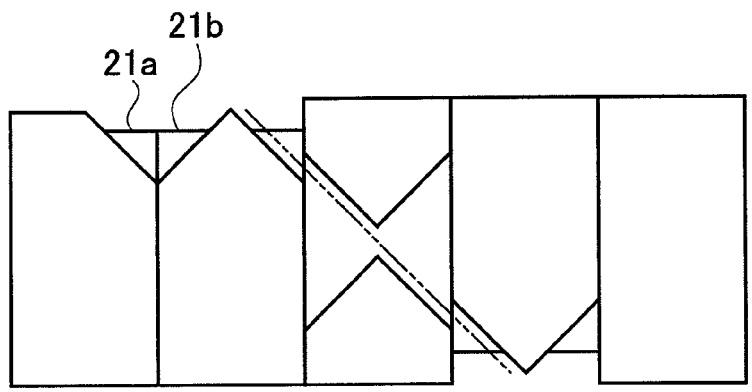
Figure 8C:
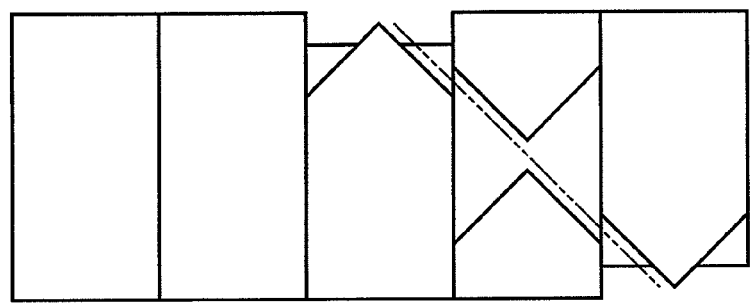
Figure 8D:
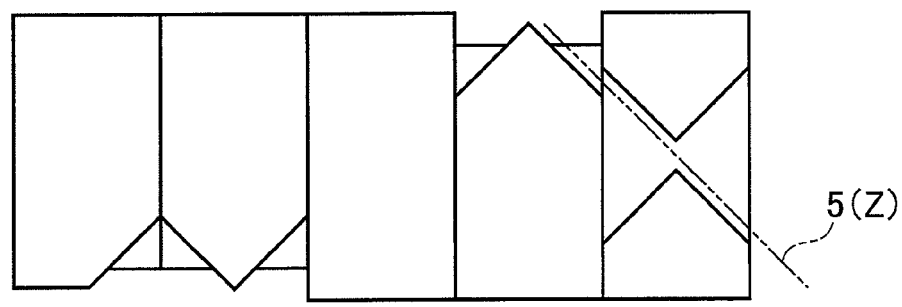
Figure 9A:
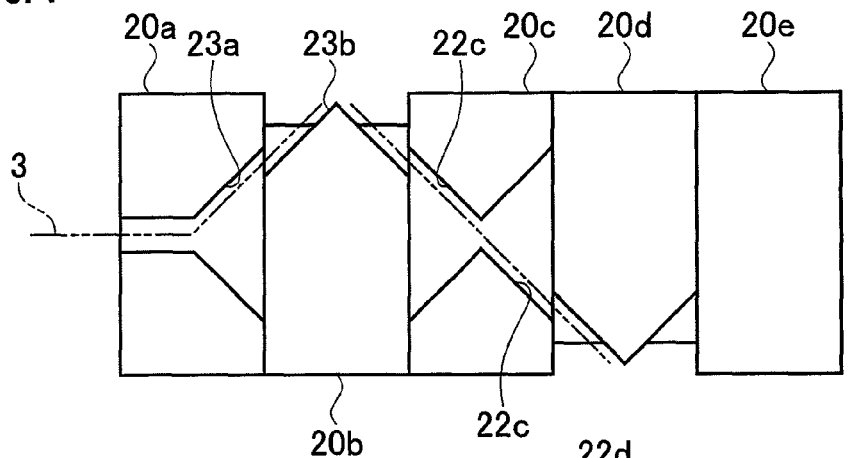
FIGS. 9A to 9D are a schematic plan view, a schematic front view, a schematic bottom view and a schematic rear view of the spiral forming dice combined as the wire processing device, and show positions of the spiral forming dice further rotated from the positions shown in FIGS. 8A to 8D through 90°.
Figure 9B:
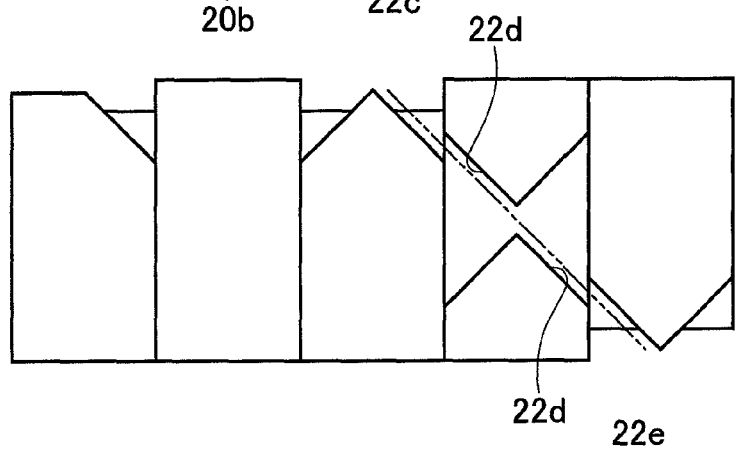
Figure 9C:
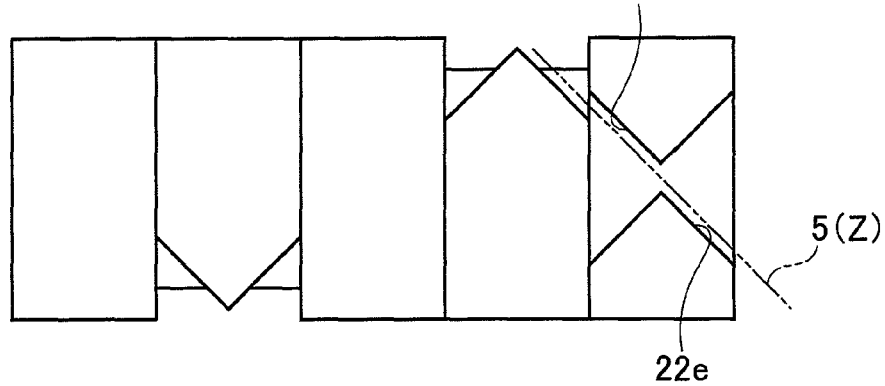
Figure 9D:
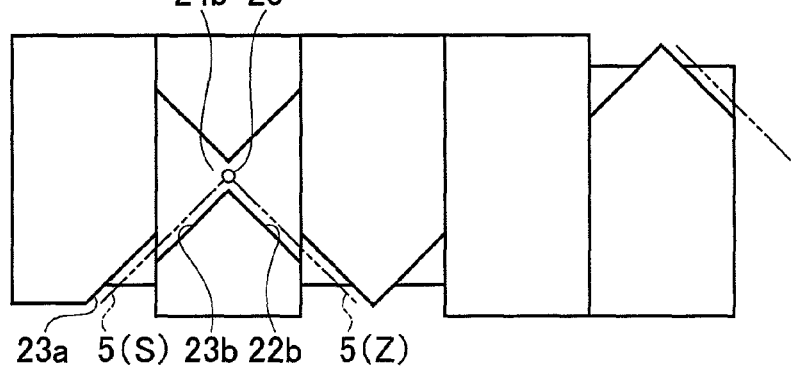
Figure 10A:
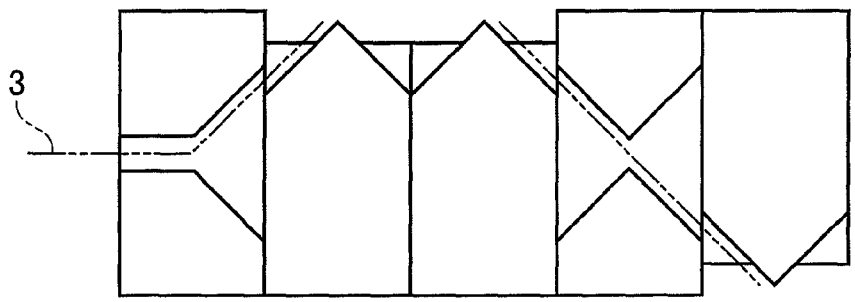
FIGS. 10A to 10D are a schematic plan view, a schematic front view, a schematic bottom view and a schematic rear view of the spiral forming dice combined as the wire processing device, and show positions of the spiral forming dice further rotated from the positions shown in FIGS. 9A to 9D through 90°.
Figure 10B:
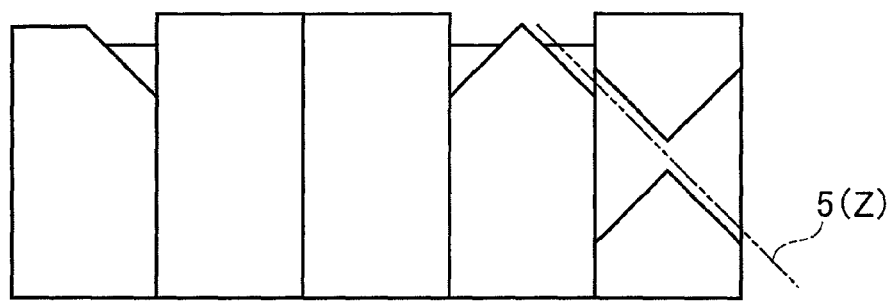
Figure 10C:
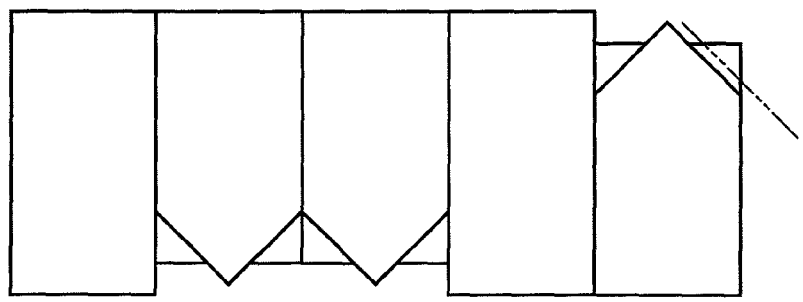
Figure 10D:
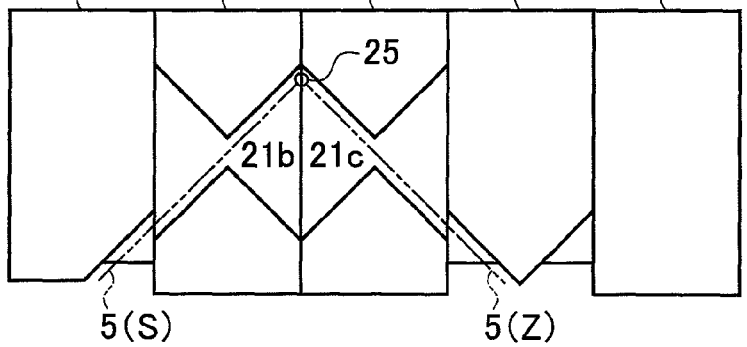
Figure 11A:
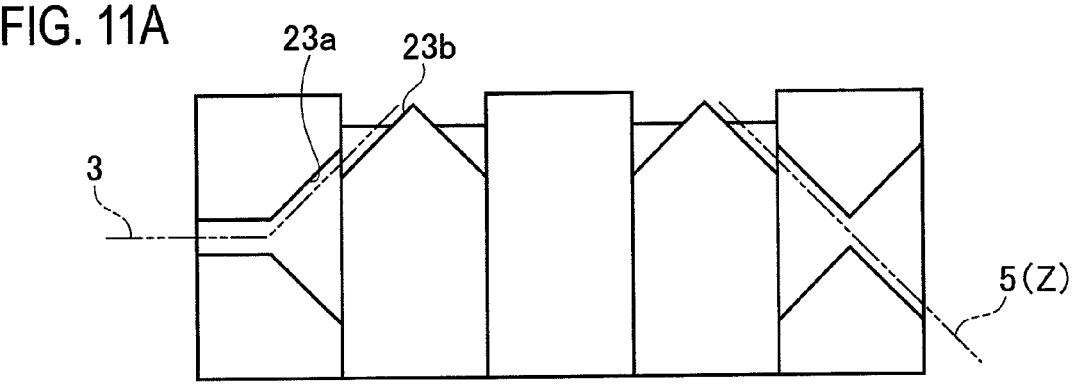
FIGS. 11A to 11D are a schematic plan view, a schematic front view, a schematic bottom view and a schematic rear view of the spiral forming dice combined as the wire processing device, and show positions of the spiral forming dice further rotated from the positions shown in FIGS. 10A to 10D through 90°.
Figure 11B:
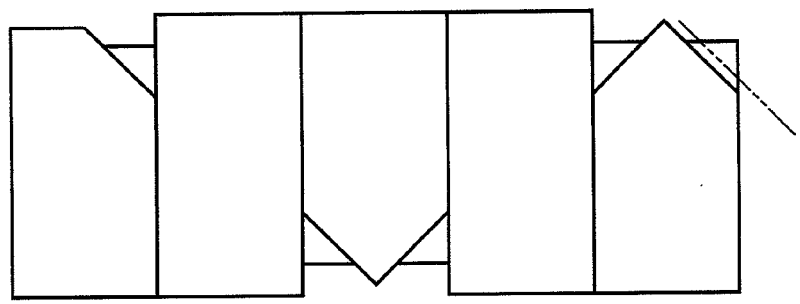
Figure 11C:
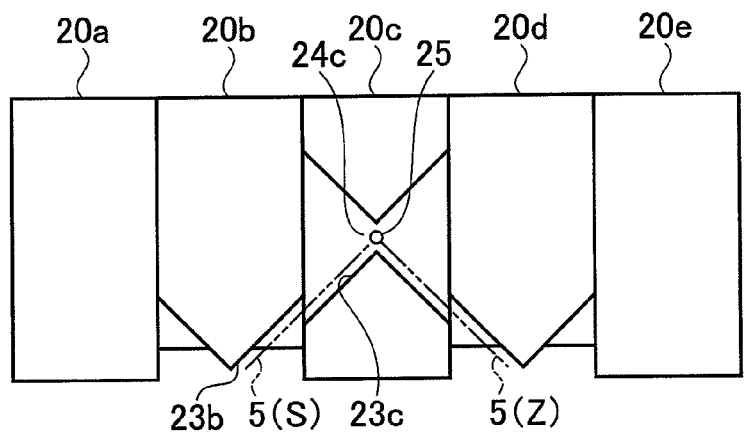
Figure 11D:
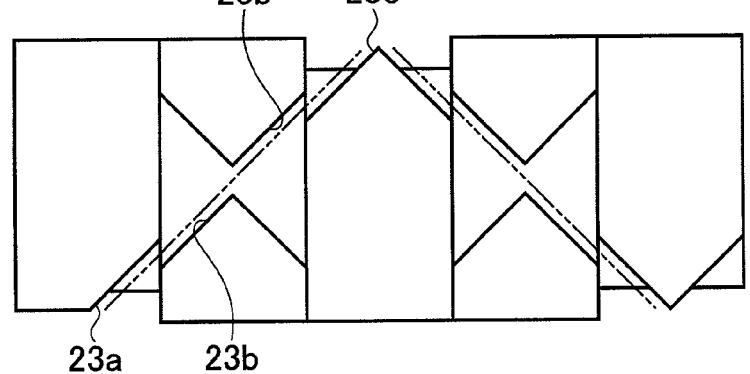
Figure 12A:
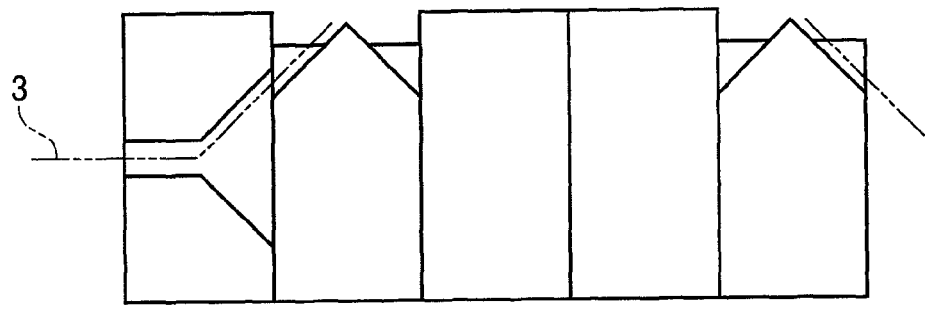
FIGS. 12A to 12D are a schematic plan view, a schematic front view, a schematic bottom view and a schematic rear view of the spiral forming dice combined as the wire processing device, and show positions of the spiral forming dice further rotated from the positions shown in FIGS. 11A to 11D through 90°.
Figure 12B:
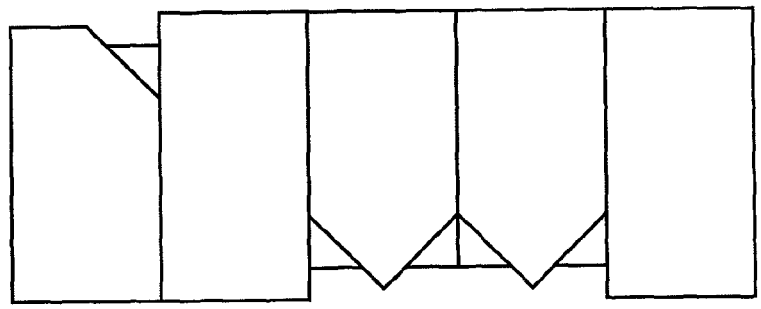
Figure 12C:
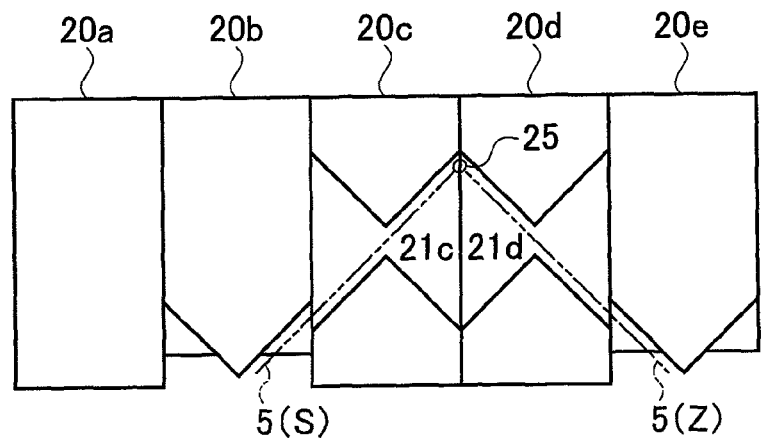
Figure 12D:
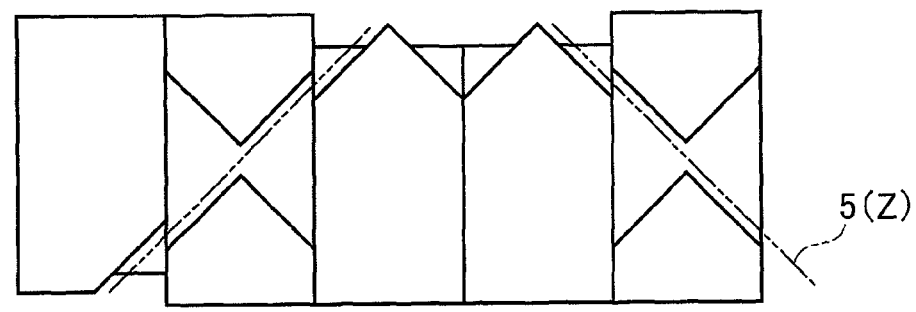
Figure 13A:
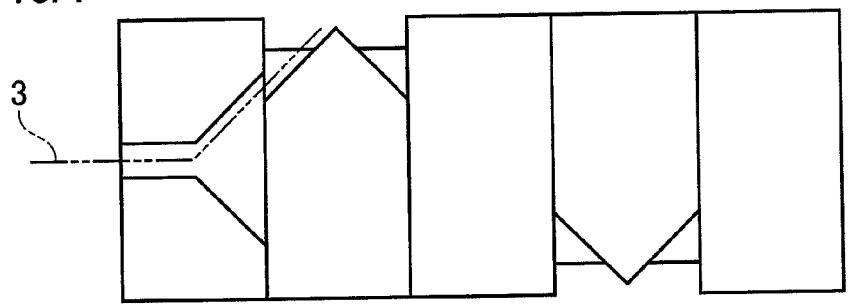
FIGS. 13A to 13D are a schematic plan view, a schematic front view, a schematic bottom view and a schematic rear view of the spiral forming dice combined as the wire processing device, and show positions of the spiral forming dice further rotated from the positions shown in FIGS. 12A to 12D through 90°.
Figure 13B:
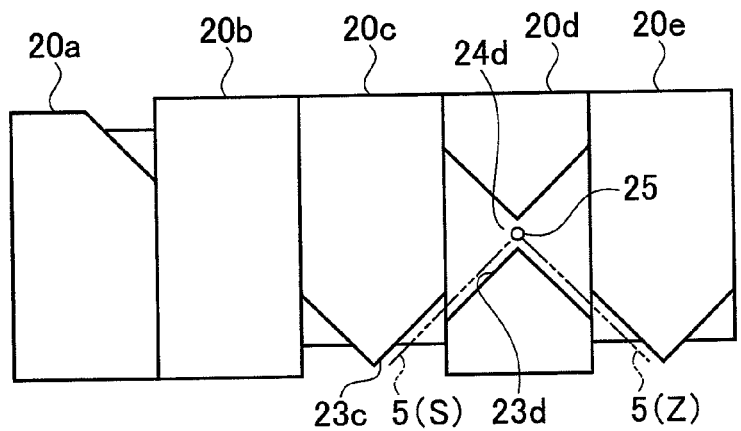
Figure 13C:
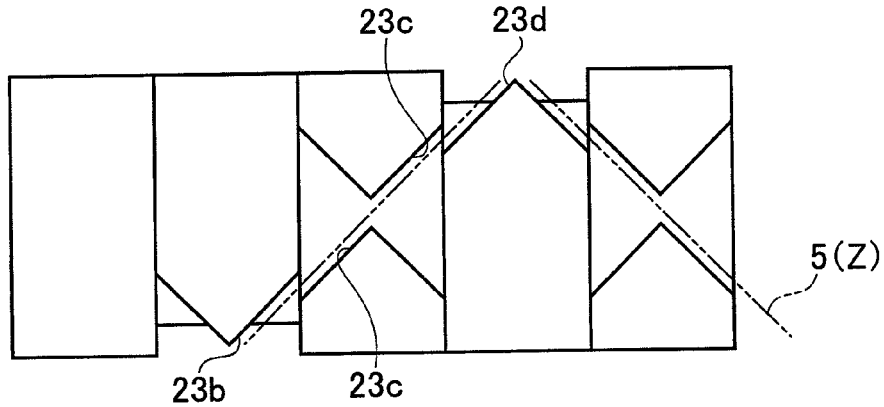
Figure 13D:
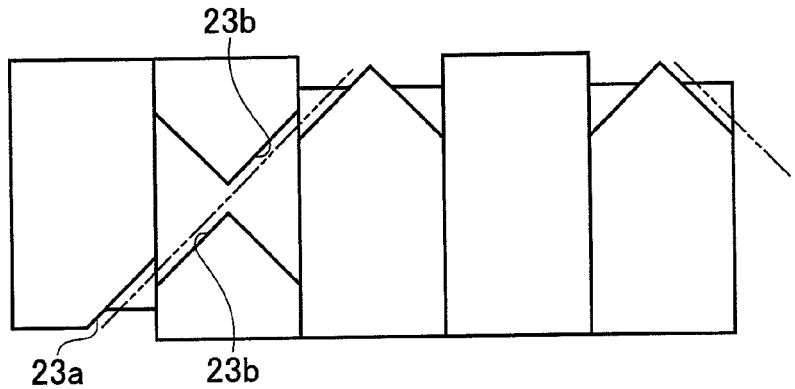
Figure 14A:
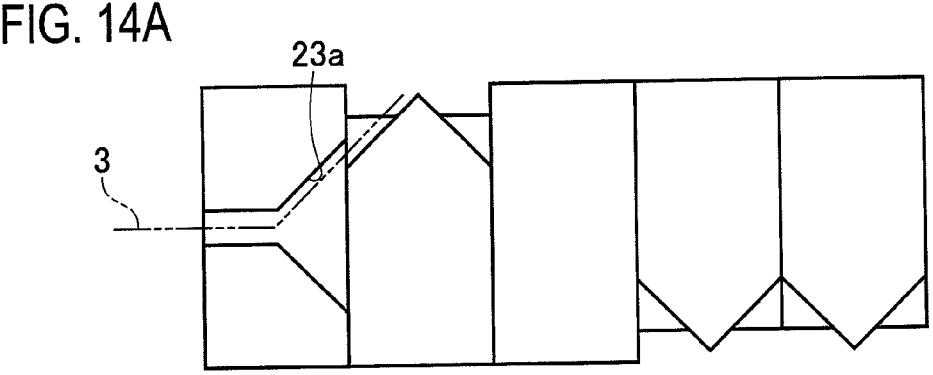
FIGS. 14A to 14D are a schematic plan view, a schematic front view, a schematic bottom view and a schematic rear view of the spiral forming dice combined as the wire processing device, and show positions of the spiral forming dice further rotated from the positions shown in FIGS. 13A to 13D through 90°.
Figure 14B:
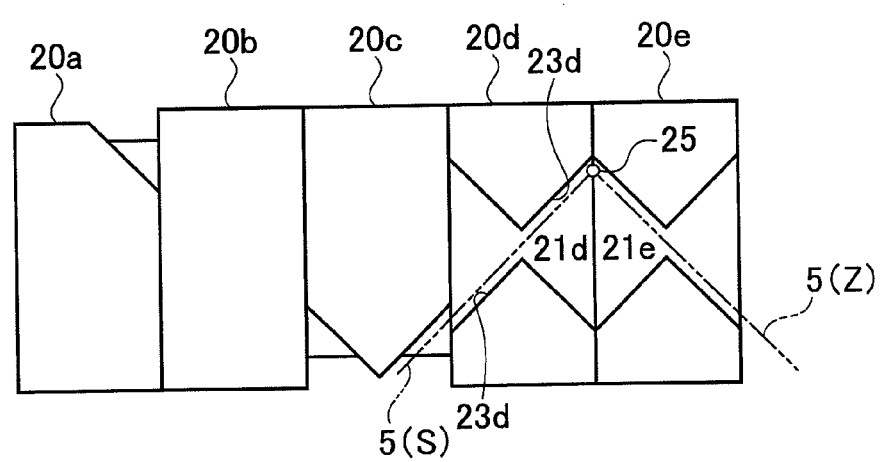
Figure 14C:
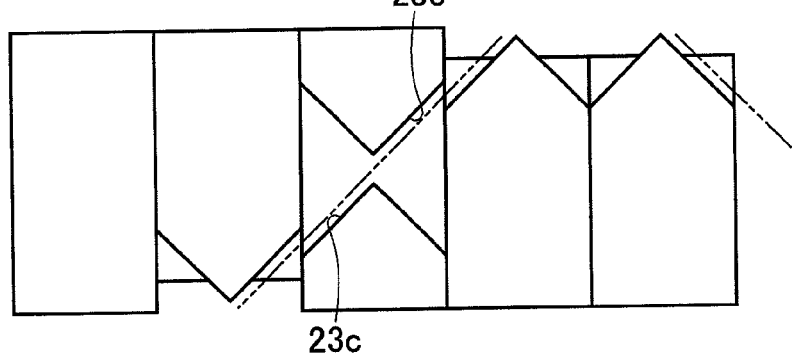
Figure 14D:
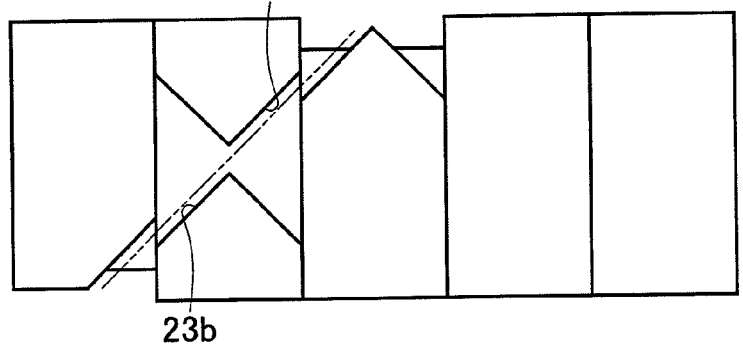
Figure 15A:
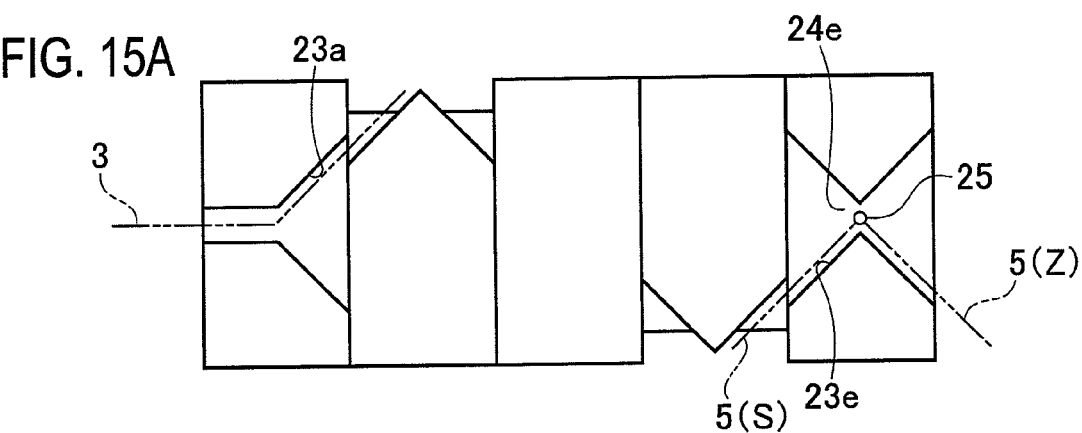
FIGS. 15A to 15D are a schematic plan view, a schematic front view, a schematic bottom view and a schematic rear view of the spiral forming dice combined as the wire processing device, and show positions of the spiral forming dice further rotated from the positions shown in FIGS. 14A to 14D through 90°.
Figure 15B:
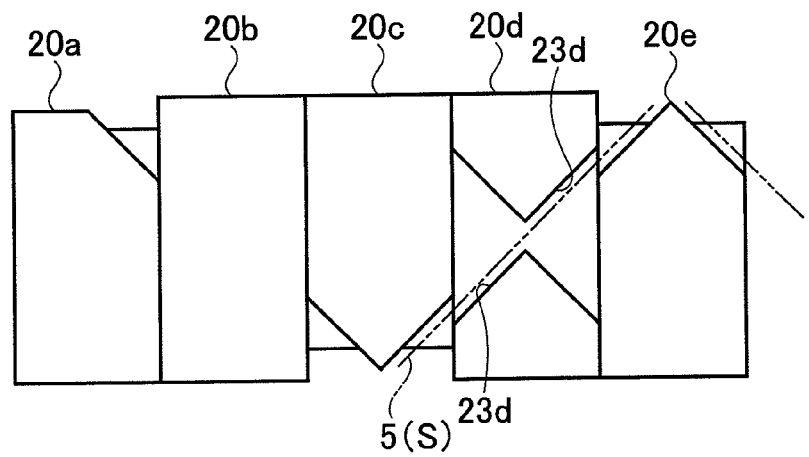
Figure 15C:
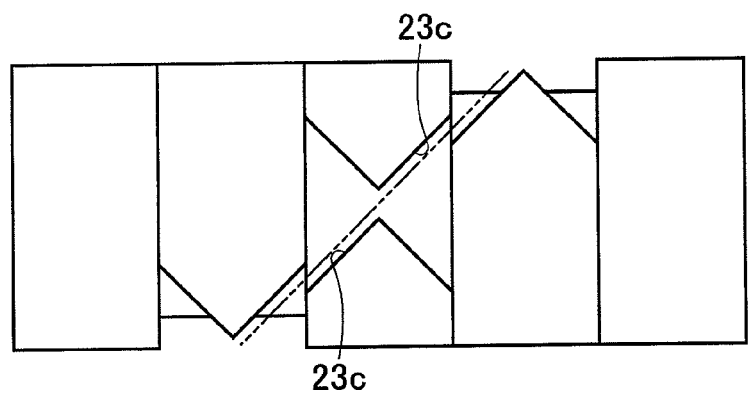
Figure 15D:
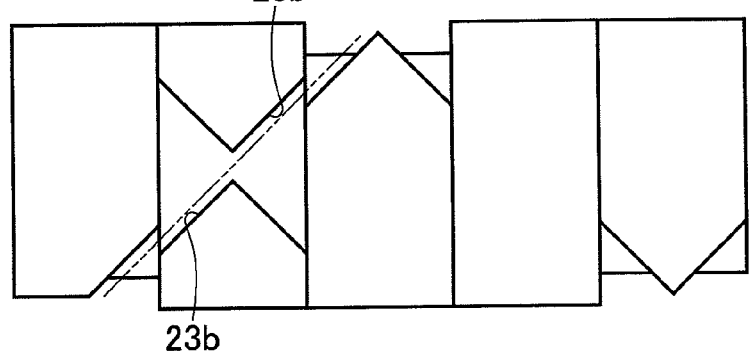
Figure 16A:
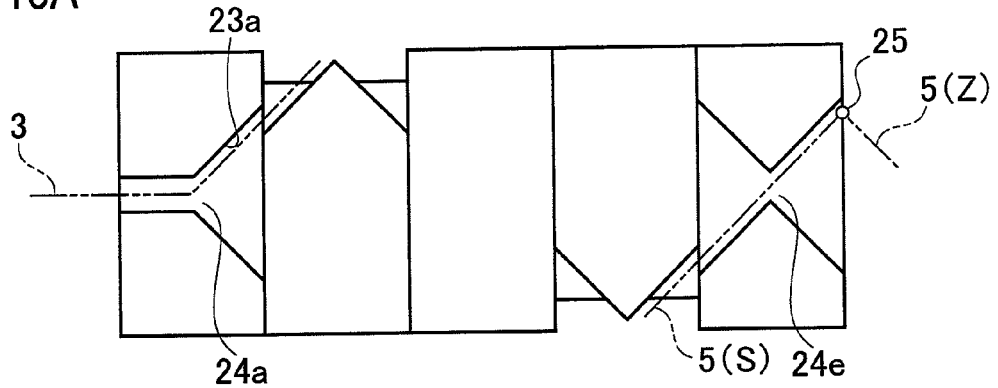
FIGS. 16A to 16D are a schematic plan view, a schematic front view, a schematic bottom view and a schematic rear view of the spiral forming dice combined as the wire processing device, and show a state where a switching part is pulled out at the positions shown in FIGS. 15A to 15D.
Figure 16B:
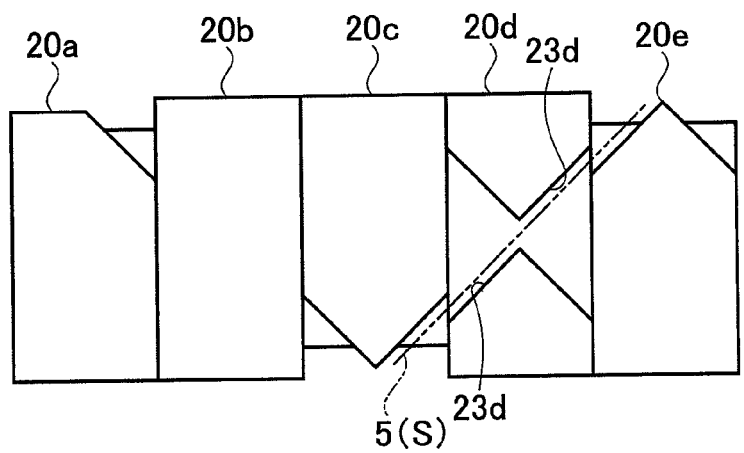
Figure 16C:
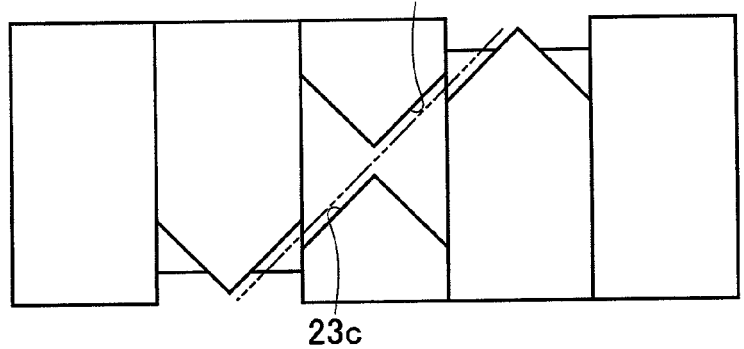
Figure 16D:
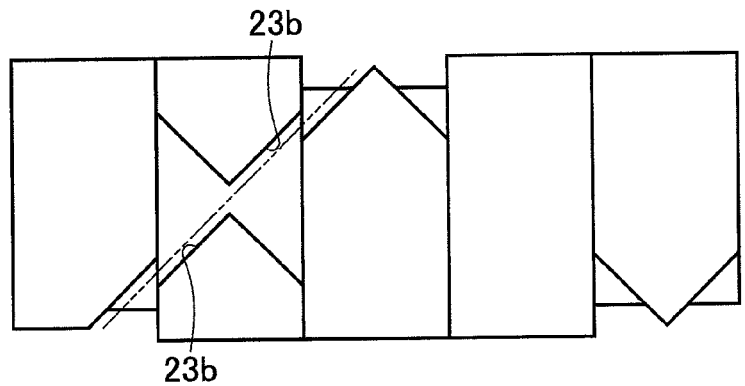

The wire processing device 10 provides a housing 11 having a cylindrical space 12 (see FIG. 6C). The hanger wire 3 is supplied from one end of the housing 11 and is sent out from the other end thereof. A plurality of spiral forming dice 20 are accommodated in the space 12 adjacent to each other such that they can rotate independently from each other.

At least five spiral forming dice 20 are required. Five spiral forming dice 20 (20a, 20b, 20c, 20d, 20e) will be explained here. That is, a first spiral forming die 20a, a second spiral forming die 20b, a third spiral forming die 20c, a fourth spiral forming die 20d and a fifth spiral forming die 20e as counted from a hanger wire supply end of the housing 11 are used.

The first spiral forming die 20a is a stationary die fixed to the housing 11, and the second to fifth spiral forming dice 20b, 20c, 20d and 20e are rotating dice supported around the axis such that they can rotate independently from each other.

The spiral forming dice 20 (20a, 20b, 20c, 20d, 20e) respectively include bottom faces 21 (21a, 21b, 21c, 21d, 21e) each forming a shape corresponding to a curvature of the spiral on a plane intersecting with the axis at right angles.

The spiral forming dice 20 (20a, 20b, 20c, 20d, 20e) respectively include Z-winding wall faces 22 (22a, 22b, 22c, 22d, 22e) for forming a shape corresponding to a pitch of a Z-winding spiral which is inclined with respect to the plane and the axis, and S-winding wall faces 23 (23a, 23b, 23c, 23d, 23e) for forming a shape corresponding to a pitch of an S-winding spiral which is inclined with respect to the plane and the axis.

In the second to fifth spiral forming dice 20b, 20c, 20d, and 20e, the Z-winding wall faces 22b, 22c, 22d, and 22e and the S-winding wall faces 23b, 23c, 23d, and 23e intersect with each other at a central portions of the second to fifth spiral forming dice 20b, 20c, 20d, and 20e in the longitudinal direction. Regions sandwiched between the Z-winding wall faces 22b, 22c, 22d, and 22e and the S-winding wall faces 23b, 23c, 23d, and 23e in front of and behind the intersections 24b, 24c, 24d, and 24e are constituted by bottom faces 21b, 21c, 21d, and 21e.

That is, in the second to fifth spiral forming dice 20b, 20c, 20d, and 20e, the bottom faces 21b, 21c, 21d, and 21e are formed such that they gradually become narrower from both sides of the spiral forming dice 20b, 20c, 20d, and 20e in the longitudinal direction toward the central portions thereof. The Z-winding wall faces 22b, 22c, 22d, and 22e and the S-winding wall faces 23b, 23c, 23d, and 23e are formed along the side edges of the bottom faces 21b, 21c, 21d, and 21e.

In the case of the first spiral forming die 20a, in the right half of the drawing, like the second to fifth spiral forming dice 20b, 20c, 20d, and 20e, the Z-winding wall face 22a and the S-winding wall face 23a intersect with each other at the intersection 24a. In the left half of the drawing of the spiral forming die 20a, the Z-winding wall face 22a and the S-winding wall face 23a are not formed, an introduction portion extending in the axis is formed instead, and a left end of the introduction portion in the drawing is a hanger wire introduction opening 26.

That is, the bottom face 21a of the first spiral forming die 20a gradually become narrower from the rear side (right in the drawing) of the spiral forming die 20a in the longitudinal direction toward its central portion. The Z-winding wall face 22a and the S-winding wall face 23a are formed along the side edge of the bottom face 21a.

When the hanger wire 3 is inserted into the spiral forming dice 20a, 20b, 20c, 20d, and 20e, the intersections 24a, 24b, 24c, 24d, and 24e of the spiral forming dice 20a, 20b, 20c, 20d, and 20e are positioned at locations arranged along the axial direction (see FIG. 2A and FIGS. 6A to 6D).

When the Z-winding spiral are formed, the Z-winding wall faces 22a, 22b, 22c, 22d, and 22e of the spiral forming dice 20a, 20b, 20c, 20d, and 20e are positioned at locations which are sequentially connected to each other (see FIGS. 7A to 7D).

When the S-winding spiral are formed, the S-winding wall faces 23a, 23b, 23c, 23d and 23e of the spiral forming dice 20a, 20b, 20c, 20d, and 20e are positioned at locations which are sequentially connected to each other (see FIGS. 16A to 16D).

The positioning operation of the spiral forming dice 20a, 20b, 20c, 20d, and 20e at the forming positions of the Z-winding spiral from the inserting positions of the hanger wire 3 is carried out by simultaneously rotating the second and subsequent spiral forming dice 20b, 20c, 20d, and 20e with respect to the spiral forming die 20a as a reference, and by sequentially stopping the second to fifth spiral forming dice 20b, 20c, 20d, and 20e from the front side (see FIGS. 2A, 2B, 2C, 3D, 3E, and 3F).

Although not shown in the drawings, the spiral forming dice 20a, 20b, 20c, 20d, and 20e are positioned at the forming positions of the S-winding spiral from the inserting positions of the hanger wire 3 in the same manner as that of the Z-winding spiral.

The second and subsequent spiral forming dice 20b, 20c, 20d, and 20e are shifted from the forming positions of the Z-winding or S-winding spiral to the forming positions of the S-winding or Z-winding spiral when the switching part 25 is formed and then, the second to fifth spiral forming dice 20b, 20c, 20d, and 20e are positioned.

The position shifting operation of the spiral forming dice 20a, 20b, 20c, 20d, and 20e from the forming positions of the Z-winding spiral to the forming positions of S-winding spiral is carried out by simultaneously rotating the second and subsequent spiral forming dice 20b, 20c, 20d, and 20e with respect to the reference first spiral forming die 20a, and by sequentially stopping the spiral forming dice 20b, 20c, 20d, and 20e from the front side (see FIGS. 7A to 16D).

Although not shown in the drawings, the position shifting operation of the spiral forming dice 20a, 20b, 20c, 20d, and 20e from the forming positions of the S-winding spiral to the forming positions of the Z-winding spiral is carried out in the same manner as the position shifting operation from the Z-winding spiral to the S-winding spiral.

The rotation velocities of the second and subsequent spiral forming dice 20b, 20c, 20d, and 20e are set to such values that the spiral forming dice 20b, 20c, 20d, and 20e rotate through a rotation angle that is necessary to shift from the forming positions of the Z-winding or S-winding spiral to the forming positions of the S-winding or Z-winding spiral while the hanger wire 3 moves from front ends to rear ends of the spiral forming dice 20b, 20c, 20d, and 20e (see FIGS. 7A to 16D). At this time, the rotation velocities of the spiral forming dice 20b, 20c, and 20d are uniform velocities.

A method for forming an S-winding spiral after a Z-winding spiral wound by predetermined times as shown in FIGS. 2A to 3F will be explained here. FIGS. 7A to 7D show states where the spiral forming dice 20a, 20b, 20c, 20d, and 20e are in the Z-winding spiral forming positions.

The spiral forming dice 20b, 20c, 20d, and 20e which can rotate are rotated leftward from the positions shown in FIGS. 7A to 7D simultaneously at uniform velocities. FIGS. 8A to 8D show positions after the dice start and rotate through 90°. At this time, the bottom face 21a of the spiral forming die 20a and the bottom face 21b of the spiral forming die 20b face each other. The hanger wire 3 is sent along an axis through a central portion of the opposed bottom faces 21a and 21b.

FIGS. 9A to 9D show positions after the dice further rotate through 90° (180° after the starting position). At this time, the S-winding wall face 23a of the spiral forming die 20a and the S-winding wall face 23b of the spiral forming die 20b are connected to each other. At this position, the second spiral forming die 20b is stopped. The hanger wire 3 is located along the Z-winding wall faces 22b, 22c, 22d, and 22e on the right side from the intersection 24b of the second spiral forming die 20b, and is located along the S-winding wall faces 23a and 23b on the left side from the intersection 24b. With this configuration, the switching part 25 is formed in the intersection 24b of the second spiral forming die 20b.

FIGS. 10A to 10D show positions after the dice further rotate through 90° (270° after the starting position). At this time, the bottom face 21b of the spiral forming die 20b and the bottom face 21c of the spiral forming die 20c face each other. The hanger wire 3 is sent until the switching part 25 is located at an upper end in the drawing in a boundary between the opposed bottom faces 21b and 21c.

FIGS. 11A to 11D show positions after the dice further rotate through 90° (360° after the starting position). At this time, the S-winding wall faces 23a and 23b of the spiral forming dice 20a and 20b and the S-winding wall face 23c of the spiral forming die 20c are connected to each other. In this position, the spiral forming die 20c is stopped. The hanger wire 3 is sent until the switching part 25 reaches the intersection 24c of the spiral forming die 20c.

FIGS. 12A to 12D show positions after the dice further rotate through 90° (450° after the starting position). At this time, the bottom face 21c of the spiral forming die 20c and the bottom face 21d of the spiral forming die 20d face each other. The hanger wire 3 is sent until the switching part 25 reaches the upper end in the drawing in the boundary between the opposed bottom faces 21c and 21d.

FIGS. 13A to 13D show positions after the dice further rotate through 90° (540° after the starting position). At this time, the S-winding wall faces 23a, 23b, and 23c of the spiral forming dice 20a, 20b, and 20c are connected to the S-winding wall face 23d of the spiral forming die 20d. The spiral forming die 20d is stopped at this position. The hanger wire 3 is sent until the switching part 25 reaches the intersection 24d of the spiral forming die 20d.

FIGS. 14A to 14D show positions after the dice further rotate through 90° (630° after the starting position). At this time, the bottom face 21d of the spiral forming die 20d and the bottom face 21e of the spiral forming die 20e face each other. The hanger wire 3 is sent until the switching part 25 reaches the upper end in the drawing in the boundary between the opposed bottom faces 21d and 21e.

FIGS. 15A to 15D show positions after the dice further rotate through 90° (720° after the starting position). At this time, the S-winding wall faces 23a, 23b, 23c, and 23d of the spiral forming dice 20a, 20b, 20c, and 20d are connected to the S-winding wall face 23e of the spiral forming die 20e. The spiral forming die 20e is stopped at this position. The hanger wire 3 is sent until the switching part 25 reaches the intersection 24e of the spiral forming die 20e.

Lastly, the switching part 25 of the hanger wire 3 passes through the right end position of the bottom face 21e of the spiral forming die 20e and comes out from the wire processing device 10 (see FIGS. 16A to 16D).

The cable hanger 5 is produced in the following manner. First, the spiral forming dice 20 (20a, 20b, 20c, 20d, 20e) are positioned at locations where the intersections 24 (24a, 24b, 24c, 24d, 24e) are arranged along the axial direction, and the hanger wire 3 is inserted into the spiral forming dice 20 (20a, 20b, 20c, 20d, 20e) along the intersections 24 (24a, 24b, 24c, 24d, 24e) from the hanger wire introduction opening 26 (see FIG. 2A and FIGS. 6A to 6D).

Next, the hanger wire 3 is supplied from the hanger wire introduction opening 26 and in this state, the spiral forming dice 20 (20a, 20b, 20c, 20d, 20e) are positioned at locations where the Z-winding or S-winding wall faces are sequentially connected to each other (see FIG. 3E and FIGS. 7A to 7D).

As shown in FIGS. 7A to 7D, when each of the spiral forming dice 20a, 20b, 20c, 20d, and 20e is positioned at the Z-winding spiral forming positions (positions where the Z-winding wall faces are sequentially connected to each other), the intersection 24a of the first spiral forming die 20a and the intersection 24e of the fifth spiral forming die 20e are disposed on the same axis. That is, one turn of spiral of 360° is formed from the intersection 24a of the first spiral forming die 20a to the intersection 24e of the fifth spiral forming die 20e.

With this configuration, the hanger wire 3 is supplied from the hanger wire introduction opening 26 and a state where the spiral forming dice 20 (20a, 20b, 20c, 20d, 20e) are positioned is maintained, and the Z-winding or S-winding spiral which is wound by predetermined times is formed (see FIG. 3F and FIGS. 7A to 7D).

Next, the hanger wire 3 is supplied from the hanger wire introduction opening 26 and in this state, the spiral forming dice 20 (20a, 20b, 20c, 20d, 20e) are shifted to positions where the S-winding or Z-winding wall faces are sequentially connected to each other and positioned (see FIGS. 7A to 16D).

As shown in FIGS. 16A to 16D, when each of the spiral forming dice 20a, 20b, 20c, 20d, and 20e is positioned at the S-winding spiral forming positions (positions where the S-winding wall faces are sequentially connected to each other), the intersection 24a of the first spiral forming die 20a and the intersection 24e of the fifth spiral forming die 20e are disposed on the same axis. That is, one turn of spiral of 360° is formed from the intersection 24a of the first spiral forming die 20a to the intersection 24e of the fifth spiral forming die 20e.

With this configuration, the hanger wire 3 is supplied from the hanger wire introduction opening 26 and a state where the spiral forming dice 20 (20a, 20b, 20c, 20d, 20e) are positioned is maintained, and the S-winding or Z-winding spiral which is wound by predetermined times is formed (see FIGS. 16A to 16D).

The above operations are then repeated by predetermined times.

In the explanation of FIGS. 6A to 16D, using the five spiral forming dice 20a, 20b, 20c, 20d, and 20e, they are deviated from one another by 90° the Z-winding wall faces 22a, 22b, 22c, 22d, and 22e or S-winding wall faces 23a, 23b, 23c, 23d, and 23e are positioned at locations where they are sequentially connected to each other, and at this time, substantially one turn of spiral of 360° is formed from the first spiral forming die 20a to the fifth spiral forming die 20e.

That is, the hanger wire 3 passes from the first spiral forming die 20a to the last spiral forming die 20e, and one turn of spiral of 360° is formed without becoming free from the spiral forming dice.

For example, this spiral shape can be formed more smoothly as compared with a case in which four spiral forming dice 20a, 20b, 20c, and 20d are used and a spiral of 270° (¾ of one turn) is formed when the hanger wire passes from the first spiral forming die 20a to the last spiral forming die 20d, and with a case in which three spiral forming dice 20a, 20b, and 20c are used and a spiral of 180° (½ of one turn) is formed when the hanger wire passes from the first spiral forming die 20a to the last spiral forming die 20c. Further, a returning amount (spring back) of the hanger wire to the spiral after the forming operation is small, and a predetermined spiral shape can be maintained more reliably.

With this configuration, the predetermined spiral shapes of the Z-winding spiral 5 (Z) and the S-winding spiral 5 (S) of the completed cable hanger 5 can be maintained reliably. Further, even when the number of windings of the Z-winding spiral 5 (Z) or S-winding spiral 5 (S) is not one, but is 1.5, 2, or 2.5, in the case of the cable hanger production system 1 which once forms one turn of spiral of 360° from the hanger wire 3 without becoming free from the spiral forming dice, a predetermined spiral shape of the completed cable hanger 5 can reliably be maintained.

When a cable hanger 5 whose number of windings of the Z-winding spiral 5 (Z) or S-winding spiral 5 (S) is not one, but is 1.5, 2, or 2.5 is to be produced, it is possible to use six, seven, or more spiral forming dice 20 can be used instead of five spiral forming dice. In such a case, the sixth, the seventh, and subsequent spiral forming dice 20 can be operated in the same relation as those of the third spiral forming die 20c with respect to the second spiral forming die 20b, the fourth spiral forming die 20d with respect to the third spiral forming die 20c, and the fifth spiral forming die 20e with respect to the fourth spiral forming die 20d. If six spiral forming dice 20 are used, a spiral of 450° winding can be formed without becoming free from the spiral forming dice. If seven spiral forming dice 20 are used, a spiral of 540° winding can be formed without becoming free from the spiral forming dice.

When six, seven, or more spiral forming dice 20 are used, it is possible to set the angle deviation between the spiral forming dice 20 can be set to an arbitrary angle θ (θ<90°) other than 90°. That is, if n (n>5) spiral forming dice 20a to 20n are used and they are deviated from one another by the angle θ (θ<90°), the Z-winding wall faces 22a to 22n or S-winding wall faces 23a to 23n are positioned to be sequentially connected to each other. At this time, one turn of spiral of substantially 360° can be formed from the first spiral forming die 20a to n-th spiral forming die 20n.

In the explanations of FIGS. 6A to 16D, the first spiral forming die 20a is the stationary die and the second to fifth spiral forming dice 20b, 20c, 20d, and 20e are the rotating dice but the invention is not limited to this. That is, the structure is not limited only if the first to fifth spiral forming dice 20a, 20b, 20c, 20d, and 20e are deviated from one another by 90° (or angle θ) in one direction when the Z-winding spiral is formed and the spiral forming dice 20a, 20b, 20c, 20d, and 20e are deviated from one another in the other direction by 90° (or angle θ) when the S-winding spiral is formed. With this configuration, if there is no problem in keep supplying the hanger wire 3 from the hanger wire introduction opening 26, the first spiral forming die 20a can be the rotating die. In this case, the second spiral forming die 20b, for example, can be the stationary die.

Next, a specific structure of each part of the cable hanger production system 1 will be explained. The cable hanger production system 1 includes the wire supply device (wire sending-out device) 40 and the wire processing device 10.

Figure 17:
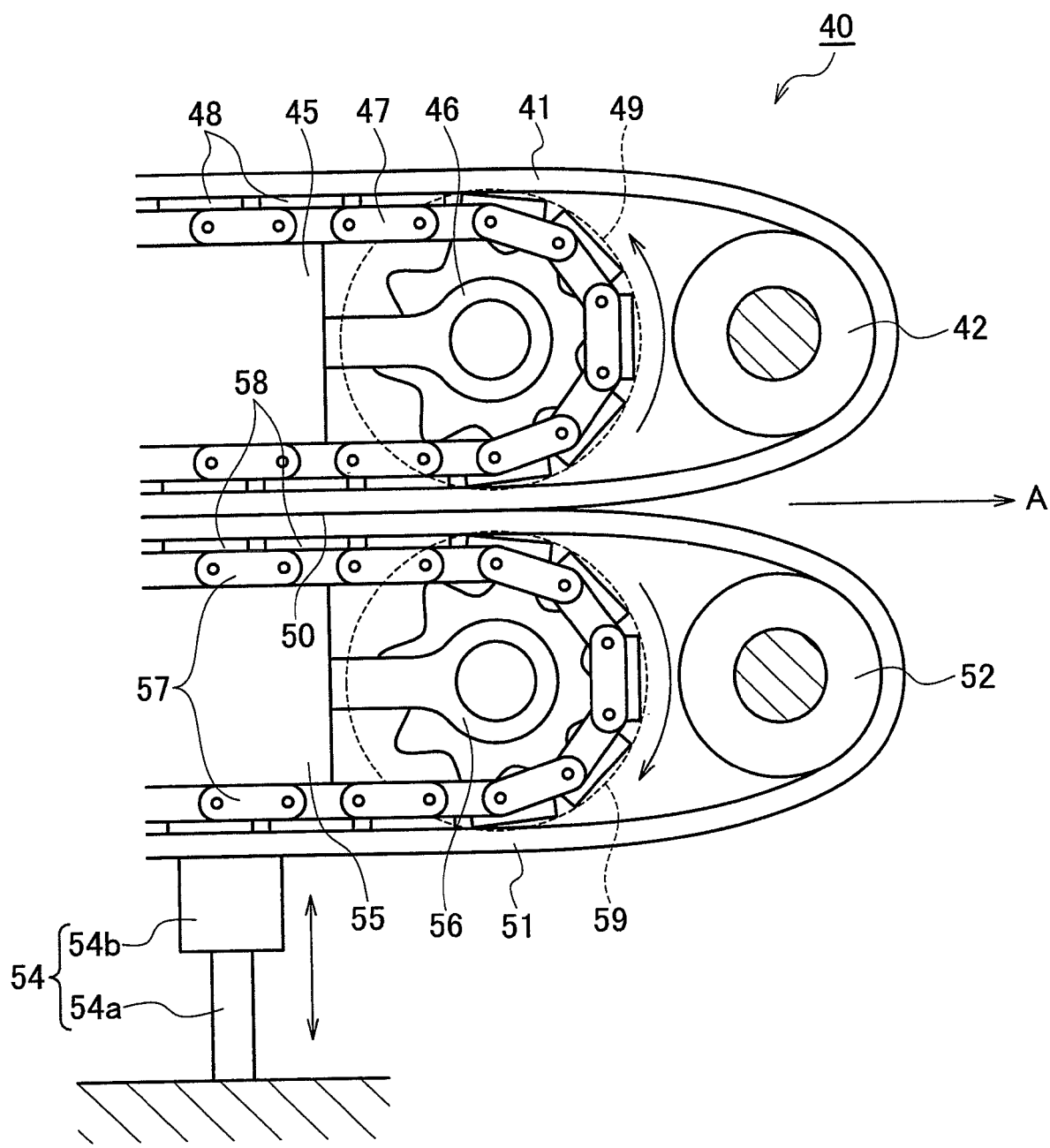
FIG. 17 is a front view of an essential structure of a wire sending-out device.
Figure 18:
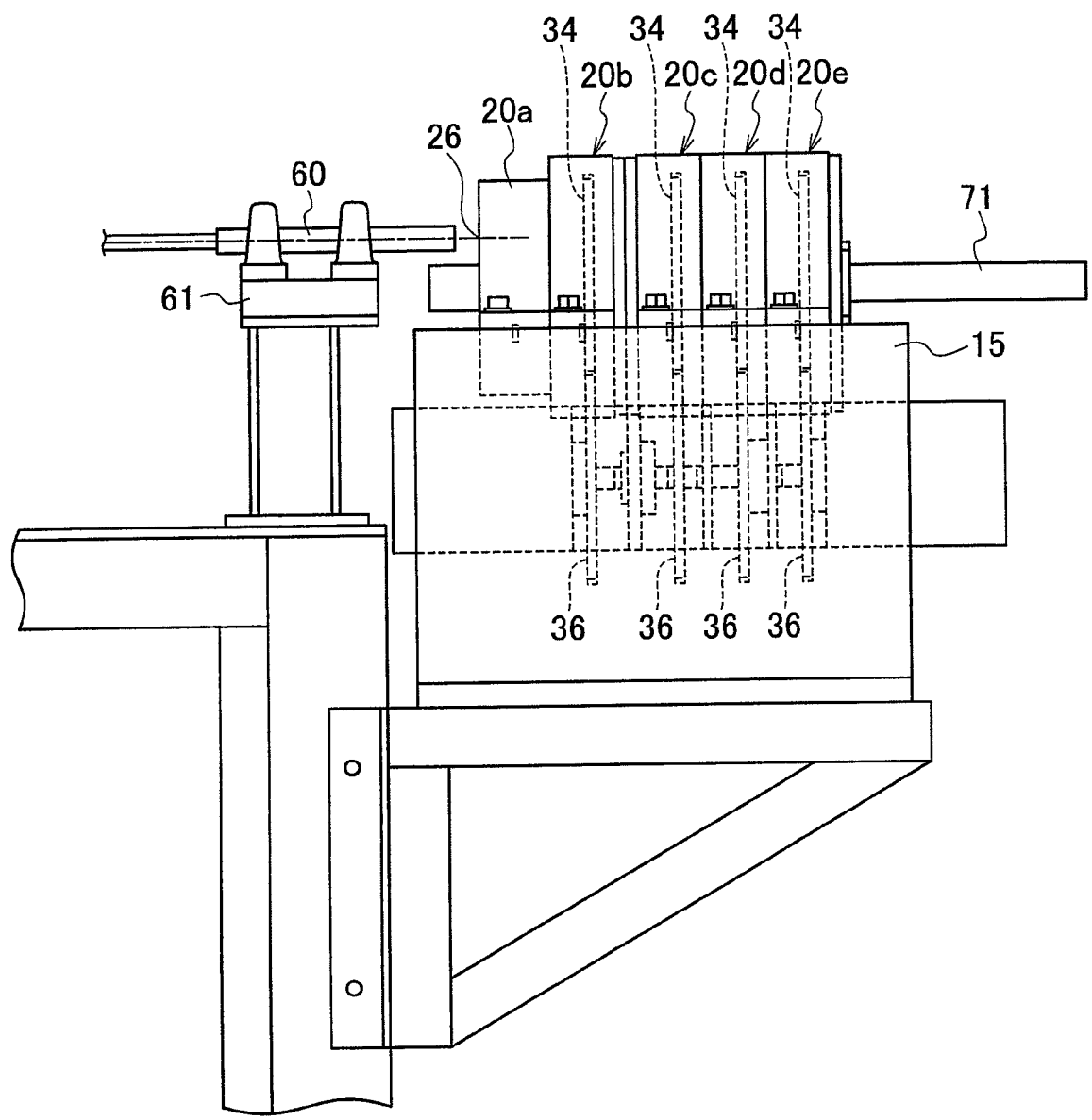
FIG. 18 is a front view showing a structure of the wire processing device.
Figure 19:
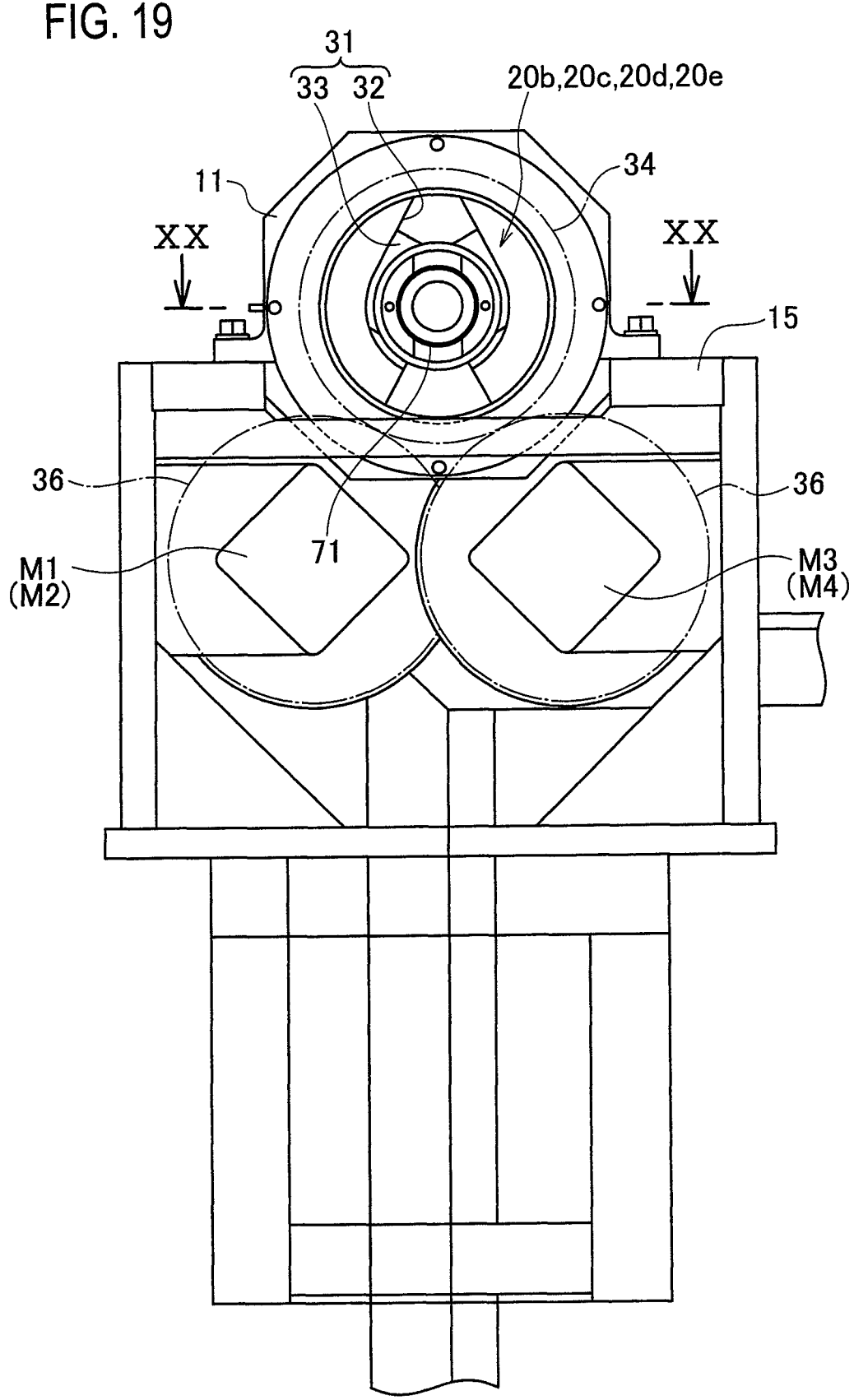
FIG. 19 is a right side view showing the structure of the wire processing device.
Figure 20:
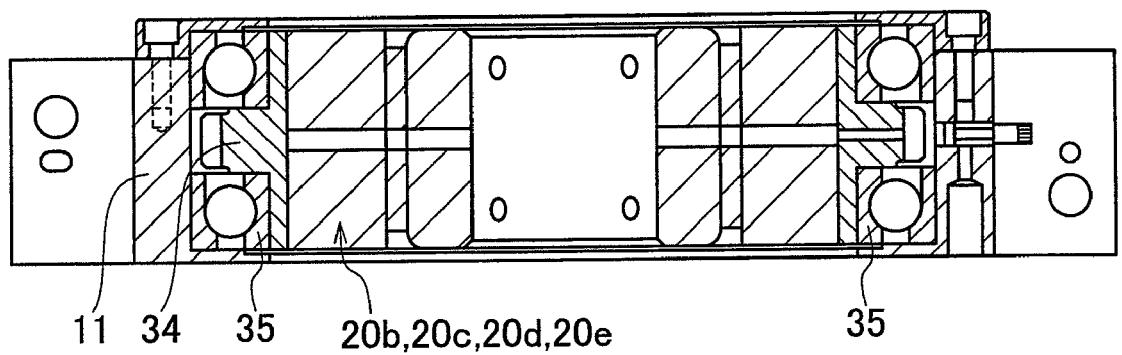
FIG. 20 is a transverse sectional plan view taken along the line XX-XX in FIG. 19.

The wire sending-out device 40 forcibly sends the hanger wire 3 which is continuously sent out from a wire drum (not shown) toward the wire processing device 10 through a wire guide 60. As shown in FIG. 17, the wire sending-out device 40 includes a stationary upper sending-out belt 41 and a vertically movable lower sending-out belt 51 disposed below the upper sending-out belt 41 such as to be opposed thereto.

The stationary upper sending-out belt 41 is wound around a rear (right in the drawing) belt rolling ring 42 in the sending-out direction moving from left to right in FIG. 17 and a front belt rolling ring (not shown) in an endless manner. A chain 47 wound around a driving sprocket 46 and a follower sprocket (not shown) supported by a base frame 45 is disposed between the rear belt rolling ring 42 and the front rolling ring. The chain 47 is provided with a support plate 48. As the support plate 48 moves, the sending-out belt 41 is rotated.

The vertically movable lower sending-out belt 51 is wound around a rear (right in the drawing) belt rolling ring 52 and a front belt rolling ring in an endless manner. A chain 57 wound around a driving sprocket 56 and a follower sprocket (not shown) supported by a movable frame 55 is disposed between the rear belt rolling ring 52 and the front belt rolling ring. The movable frame 55 is vertically moved by a vertically moving hydraulic device 54. The hydraulic device 54 includes a piston 54a and a cylinder 54b. The chain 57 is provided with a support plate 58. As the support plate 58 moves, the sending-out belt 51 is rotated.

A driving motor 49 which drives the driving sprocket 46 of the upper sending-out belt 41, a driving motor 59 which drives a driving sprocket 56 of the lower sending-out belt 51 and the hydraulic device 54 which vertically moves the lower sending-out belt 51 are controlled based on commands from a control device 65. When the lower sending-out belt 51 is in the lifted position (ON position) by the lifting operation of the hydraulic device 54, the lower sending-out belt 51 is crimped onto the upper sending-out belt 41 under pressure. At this time, the crimping faces of the sending-out belts 41 and 51 are supported by the support plates 48 and 58, and effect for strongly sandwiching the hanger wire 3 from above and below is generated. With this configuration, a sandwiching face 50 which is long in the longitudinal direction is secured, and the hanger wire 3 can be strongly and reliably sent out by the long sandwiching face 50 (in the direction of arrow A in FIG. 17).

The wire guide 60 is formed into a cylindrical shape in which the hanger wire 3 can be guided, and the wire guide 60 is supported by a guide base 61. A front end of the wire guide 60 is located adjacent to a sending out opening of the wire sending-out device 40. A rear end of the wire guide 60 is located adjacent to the hanger wire introduction opening 26 of the wire processing device 10. The wire guide 60 reliably guides the hanger wire 3 such that the hanger wire 3 which is forcibly sent out from the wire sending-out device 40 is not bent between the sending out opening and the hanger wire introduction opening 26 by a strong sliding resistance generated when the hanger wire 3 is sent into the wire processing device 10.

The first to fourth rotating dice 20b, 20c, 20d, and 20e are respectively for guiding the spiral up to 90°, for guiding the spiral up to 180°, for guiding the spiral up to 270° and for guiding the spiral up to 360°.

As shown in FIGS. 18 to 21, the first rotating die 20b is provided at its outer peripheral face with a spiral forming guide 31 and a ring-like meshing gear 34. The first rotating die 20b having the spiral forming guide 31 and the meshing gear 34 are rotatably supported by a bearing 35 with respect to the die housing 11. The meshing gear 34 is in mesh with a first driving gear 36 through an opening (not shown) formed in the die housing 11.

The spiral forming guide 31 is a combination of a pair of opposed inclined guide faces 32 which incline forward, and a pair of opposed induction arc faces 33 provided inside the inclined guide faces 32.

Figure 21:
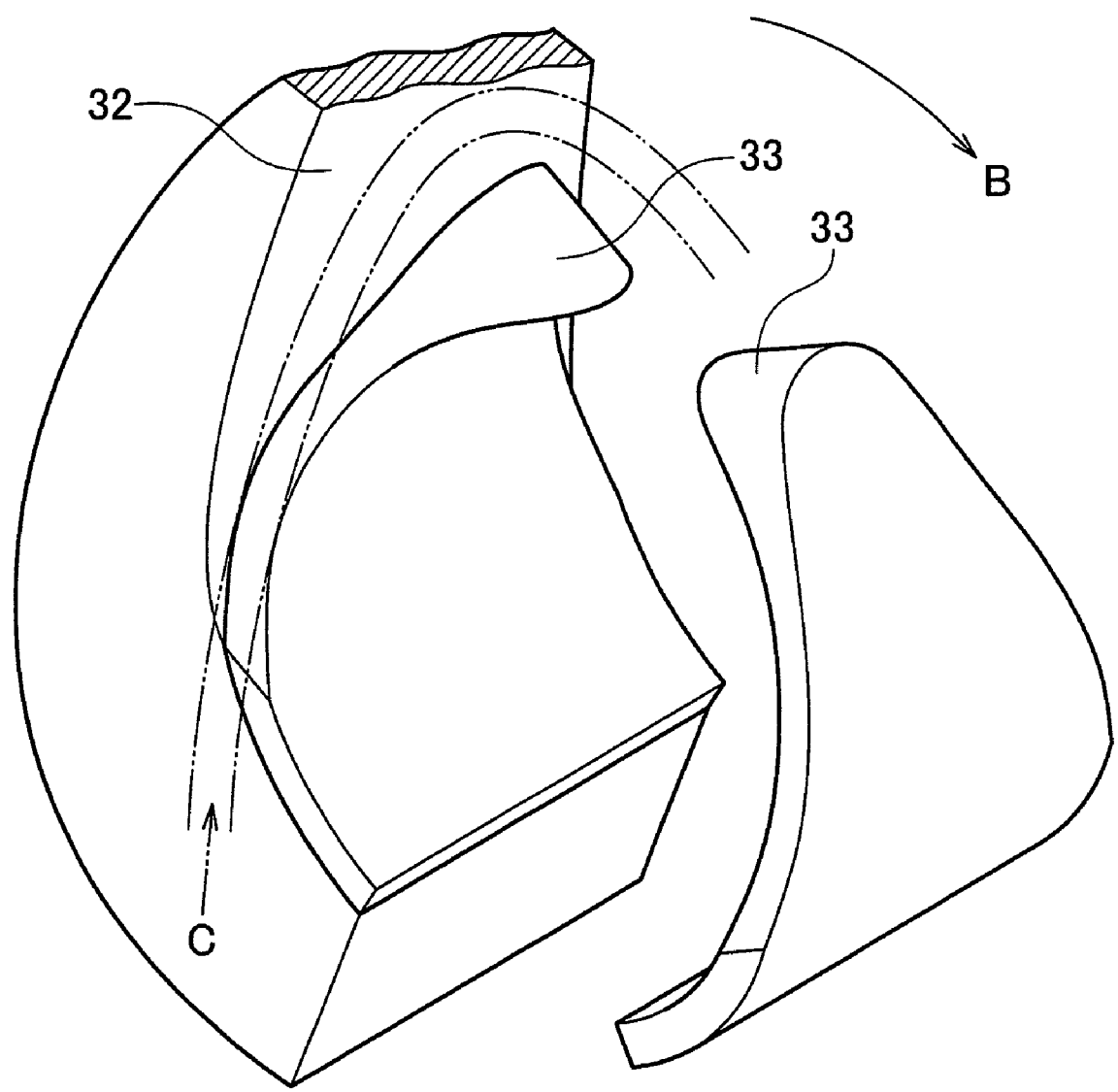
FIG. 21 is a perspective view of an essential portion showing a pair of induction arc faces of a spiral forming guide provided on a rotating spiral forming die.

In FIG. 21, when the induction arc faces 33 and the inclined guide faces 32 are rotated in the direction of the arrow B and the hanger wire 9 is sent out as shown with the arrow C, the induction arc faces 33 and the inclined guide faces 32 form the spiral form.

Figure 25:
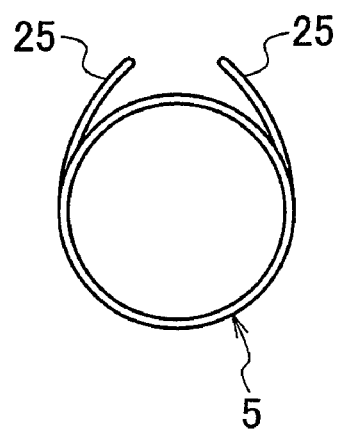
FIG. 25 is an explanatory diagram of the cable hanger shown in FIG. 24 as viewed from the axial direction.

In this case, the inclined guide faces 32 of the first rotating die 20b which can form the switching part (inverting part) 25 of the cable hanger 5 forms a shape which raises the switching part (inverting part) 25 outside the arc region as shown in FIG. 25.

Meanwhile, the meshing gear 34 meshes with the first driving gear 36 to which a rotation force is applied by a first die driving motor M1 which can rotate normally and reversely. The rotation force from the first die driving motor M1 is transmitted to the first rotating die 20b through the first driving gear 36 and the meshing gear 34, and the first rotating die 20b is rotated normally or reversely.

The second, third and fourth rotating dice 20c, 20d, and 20e have the same structure as that of the first rotating die 20b. Normal and reversed rotation force is given to the second rotating die 20c by a second die driving motor M2, normal and reversed rotation force is given to the third rotating die 20d by a third die driving motor M3 and normal and reversed rotation force is given to the fourth rotating die 20e by a fourth die driving motor M4.

The die housings 11 of the first to fourth rotating dice 20b, 20c, 20d, and 20e are disposed on the same axis X with respect to the base housing 15.

The die driving motors M1, M2, M3, and M4 of the first to fourth rotating dice 20b, 20c, 20d, and 20e are controlled based on commands from the control device 65.

Figure 22:
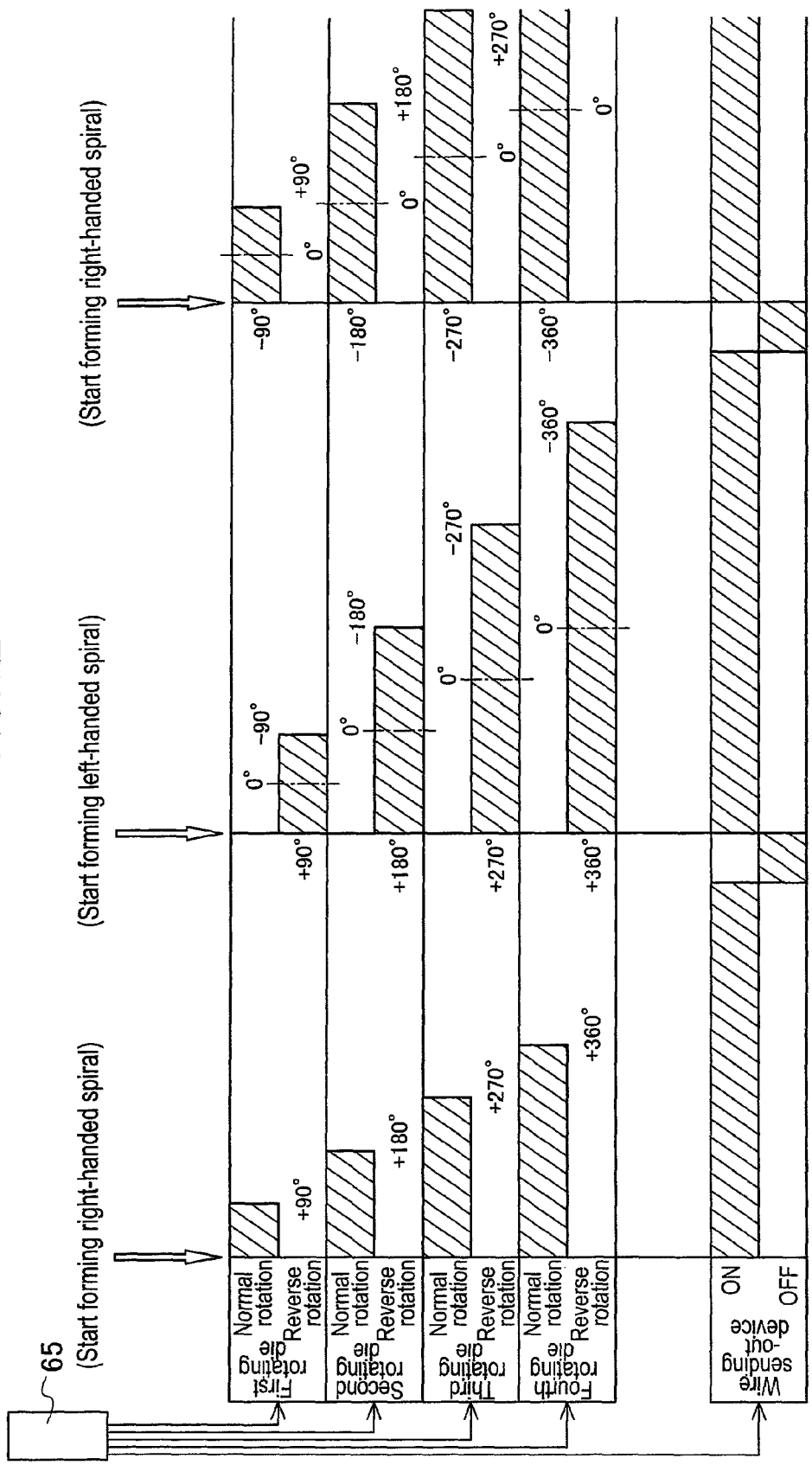
FIG. 22 is a time chart showing an operation of the rotating spiral forming dice and wire sending-out device.

The control device 65 outputs operation commands to the first to fourth rotating dice 20b, 20c, 20d, and 20e and the wire sending-out device 40 based on a preset program. FIG. 22 shows such a relationship.

FIG. 22 is a time chart showing a relation between normal and reverse rotations of the first to fourth rotating dice 20b, 20c, 20d, and 20e and ON and OFF of the wire sending-out device 40.

That is, the first to fourth rotating dice 20b, 20c, 20d, and 20e normally rotate respectively through 90°, 180°, 270°, and 360° under a condition that a state where the spiral forming guides 31 are arranged on the same axis X as that of the hanger wire introduction opening 26 is defined as 0°. Next, the first to fourth rotating dice 20b, 20c, 20d, and 20e rotate in the opposite side (reversely rotate) beyond 0° at which the first to fourth rotating dice 20b, 20c, 20d, and 20e are arranged on the same axis X. The first to fourth rotating dice 20b, 20c, 20d, and 20e alternately repeat the normal rotation and reverse rotation.

This will be specifically explained based a definition that rightward rotation is called plus side and leftward rotation is called minus side.

The first rotating die 20b starts from 0° and (normally) rotates rightward (plus side) by +90°. Next, the first rotating die 20b returns from the position of +90° to 0° and (reversely) rotates leftward (minus side) by −90°. The first rotating die 20b then returns from the position of −90° to 0° and again (normally) rotates rightward (plus side) by +90°. The first rotating die 20b repeats these operations alternately.

The second rotating die 20c starts from 0° and (normally) rotates rightward (plus side) by +180°. Next, the second rotating die 20c returns from the position of +180° to 0° and (reversely) rotates leftward (minus side) by −180°. The second rotating die 20c then returns from the position of −180° to 0° and again (normally) rotates rightward (plus side) by +180°. The second rotating die 20c repeats these operations alternately.

The third rotating die 20d starts from 0° and (normally) rotates rightward (plus side) by +270°. Next, the third rotating die 20d returns from the position of +270° to 0° and (reversely) rotates leftward (minus side) by −270°. The third rotating die 20d then returns from the position of −270° to 0° and again (normally) rotates rightward (plus side) by +270°. The third rotating die 20d repeats these operations alternately.

The fourth rotating die 20e starts from 0° and (normally) rotates rightward (plus side) by +360°. Next, the fourth rotating die 20e returns from the position of +360° to 0° and (reversely) rotates leftward (minus side) by −360°. The fourth rotating die 20e then returns from the position of −360° to 0° and again (normally) rotates rightward (plus side) by +360°. The fourth rotating die 20e repeats these operations alternately.

On the other hand, the wire sending-out device 40 is once turned ON (crimping and sending out state) at the start position, and the ON state is continued for a constant time even after rotating operations of the first to fourth rotating dice 20b, 20c, 20d, and 20e by 90°, 180°, 270°, and 360° are completed. The wire sending-out device 40 is turned OFF and then, is again brought into the ON state (crimping and sending out state). The wire sending-out device 40 repeats the ON and OFF operations.

Figure 23:
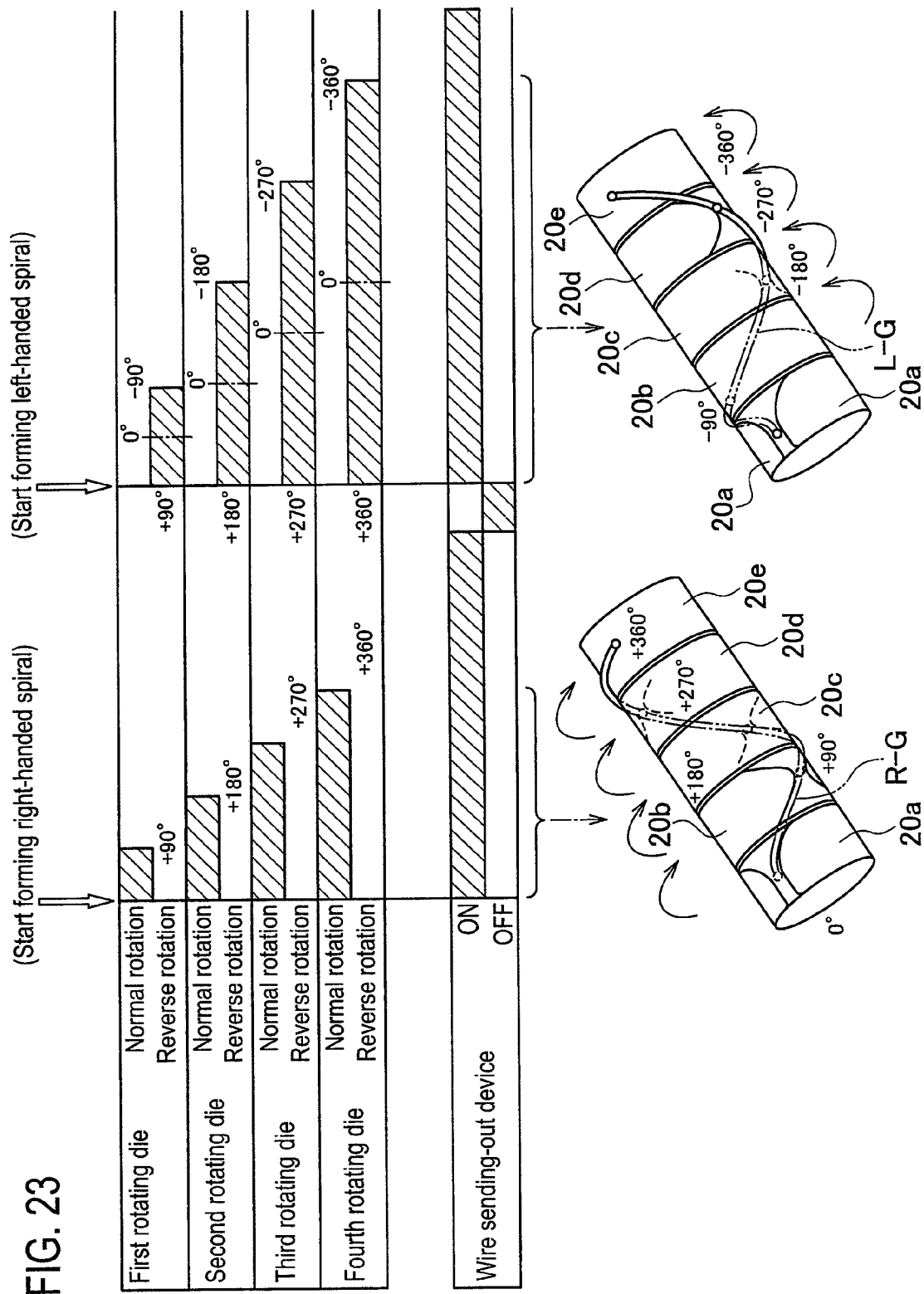
FIG. 23 is an explanatory diagram showing a Z-winding spiral forming state and an S-winding spiral forming state by the spiral forming dice combined as the wire processing device.

A relationship between the wire sending-out device 40 and the first to fourth rotating dice 20b, 20c, 20d, and 20e at the time will be explained with reference to FIG. 23.

In an ON region where the wire sending-out device 40 is turned ON (crimping and sending out state) simultaneously with start, the first to fourth rotating dice 20b, 20c, 20d, and

20e (normally) rotate to positions of +90°, +180°, +270°, and +360°, respectively. With this configuration, right-handed spiral guide R-G to 360° is formed by spiral forming guides 31 of the first to fourth rotating dice 20b, 20c, 20d, and 20e as shown in FIG. 23. By forcibly sending the hanger wire 3 along the right-handed spiral guide R-G, a right-handed spiral portion 5-R having a predetermined number of windings is obtained.

In a next ON region where the wire sending-out device 40 is once turned OFF and is again turned ON (crimping and sending out state), the first to fourth rotating dice 20b, 20c, 20d, and 20e (reversely) rotate to positions of −90°, −180°, −270°, and −360°, respectively. With this configuration, a left-handed spiral guide L-G to 360° is formed by spiral forming guides 31 of the first to fourth rotating dice 20b, 20c, 20d, and 20e as shown in FIG. 23. By forcibly sending the hanger wire 3 along the left-handed spiral guide L-G, a left-handed spiral portion 5-L having a predetermined number of windings is obtained.

Although the right-handed rotation of the first to fourth rotating dice 20b, 20c, 20d, and 20e is defined as normal rotation and the left-handed rotation thereof is defined as reverse rotation in the above explanations, left-handed rotation can be defined as normal rotation and right-handed rotation can be defined as reverse rotation. To form smooth spiral guides, five combined dice including the stationary die 20a and the first to fourth rotating dice 20b, 20c, 20d, and 20e is employed in the above explanations. However, three combined dice including the stationary die 20a and the first and second rotating dice 20b and 20c can also be employed.

The wire sending-out device 40 is in a state where the movable sending-out belt 51 is lowered with respect to the stationary sending-out belt 41 in the OFF region, and the sandwiching state of the hanger wire 3 is released. This OFF period is 1 to 2 seconds. With this configuration, when the hanger wire 3 enters into the next left-handed spiral portion 5-L from the right-handed spiral portion 5-R, the sandwiched state of the hanger wire 3 can be released temporarily, and torsion reaction force can be released temporarily.

The wire sending-out device 40 can also alternately and continuously form the right-handed spiral portion 5-R and the left-handed spiral portion 5-L even without providing the OFF period in which the sandwiching state of the hanger wire 3 is released and in the ON state (crimping and sending out state) in which the sending out operation is continued. Even when the number of windings of the right-handed spiral portion 5-R and the number of windings of the left-handed spiral portion 5-L are relatively small as about 2.0 windings (about 1.5 to 2.5 windings), it is possible to produce the cable hanger 5 having a sufficient quality.

A cable hanger taking-out device 70 includes a cable hanger support member 71 having a predetermined length provided on the fourth rotating die 20e, and a winder drum 72 which reels up the cable hanger 5 as a product.

The cable hanger support member 71 is formed into a cylindrical shape which is integrally mounted on a central shaft of the fourth rotating die 20e, and rotates integrally with the fourth rotating die 20e. Therefore, the cable hanger 5 sent out from the fourth rotating die 20e is supported by the cable hanger support member 71 over a predetermined length without falling on the ground and then, the cable hanger 5 is reeled up around the winder drum 72.

Figure 26:
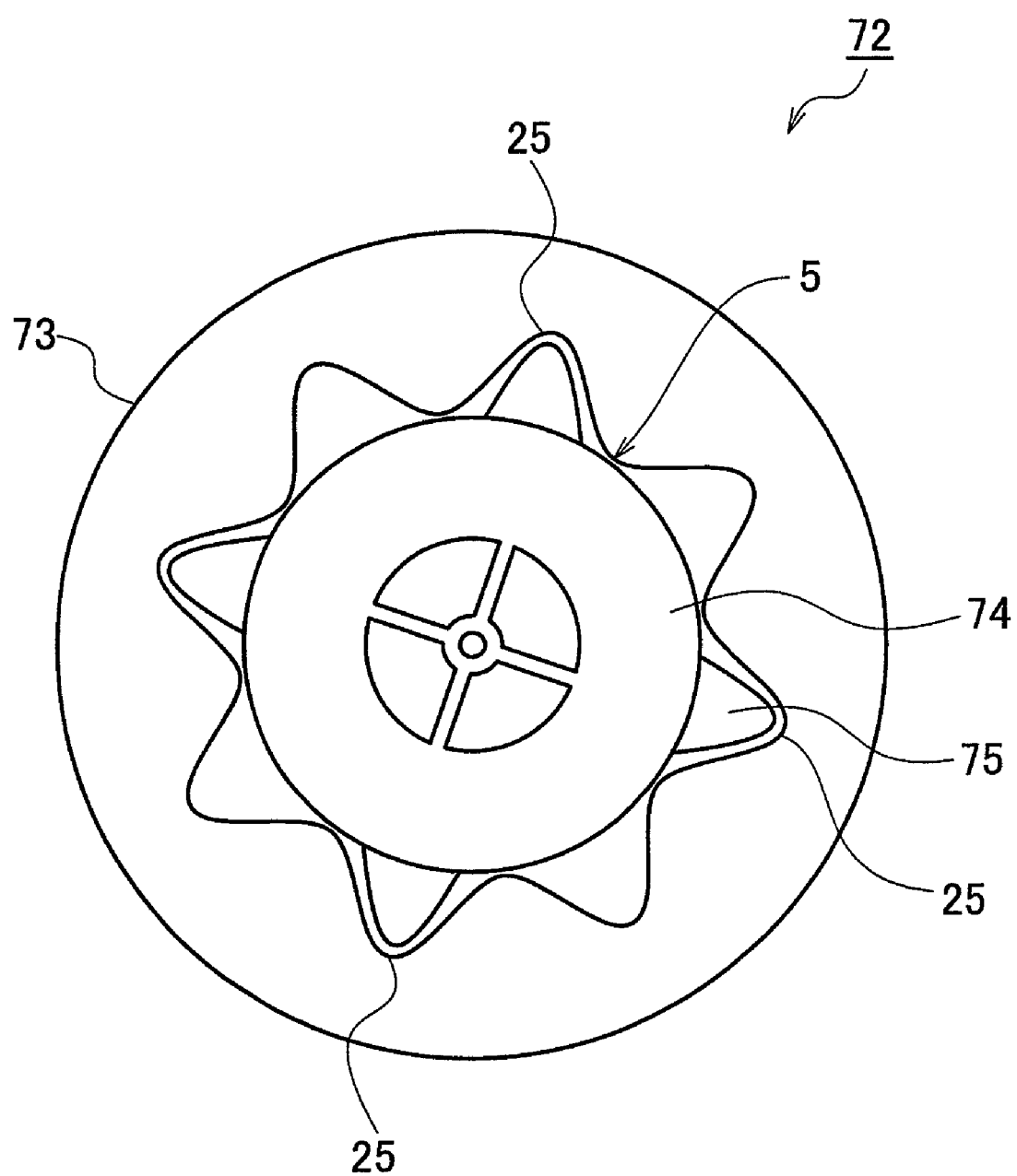
FIG. 26 is an explanatory diagram of a state where one of winder flanges of a winder drum is removed.

The winder drum 72 includes a pair of left and right winder flanges 73, a winder barrel 74 located between the winder flanges 73, and a plurality of projecting portions 75 formed on a periphery of the winder barrel 74 at predetermined distances from one another in the peripheral direction. The projecting portions 75 project radially outward over substantially entire length of the winder barrel 74. When the cable hanger 5 is reeled up around the winder barrel 74 of the winder drum 72, the right-handed spiral portion 5-R or the left-handed spiral portion 5-L is extended in a corrugate form as shown in FIG. 26 and the cable hanger 5 is reeled up in an unstable state. At this time, if the switching part (inverting part) 25 located at junction between the right-handed spiral portion 5-R and the left-handed spiral portion 5-L is locked to the projecting portions 75, the cable hanger 5 can be stabilized and reliably reeled up.

One of the left and right winder flanges 73 is detachably mounted on the winder barrel 74. When the winder flange 73 is detached, the winder barrel 74 is exposed and the cable hanger 5 can easily be detached from the winder barrel 74.

A production method of the cable hanger 5 by the cable hanger production system 1 will be explained. First, as shown in FIG. 1, the spiral forming guides 31 of the first to fourth rotating dice 20b, 20c, 20d, and 20e are set on the same axis X as the hanger wire introduction opening 26. The hanger wire 3 which is continuous in the longitudinal direction is inserted into the spiral forming guides 31 from the hanger wire introduction opening 26. Next, the wire sending-out device 40 is brought into the ON state, the hanger wire 3 is sent out and at the same time, the first to fourth rotating dice 20b, 20c, 20d, and 20e are rotated rightward to the positions of +90°, +180°, +270°, and +360°, respectively. With this configuration, the hanger wire 3 forms the right-handed spiral up to 360°. At this time, the right-handed spiral guide R-G is formed by the first to fourth rotating dice 20b, 20c, 20d, and 20e. Therefore, the right-handed spiral portion 5-R having a predetermined number of windings can be obtained by forcibly keeping sending the hanger wire 3 continuously for a constant time.

Next, the sandwiching state of the hanger wire 3 is temporarily released and the torsion reaction force is released. The hanger wire 3 is again sent out, and at the same time, the first to fourth rotating dice 20b, 20c, 20d, and 20e are rotated leftward to positions of −90°, −180°, −270°, and −360° beyond 0°, respectively. With this configuration, the hanger wire 3 forms the left-handed spiral until 360° through the switching part (inverting part) 25. At this time, the left-handed spiral guide L-G is formed by the first to fourth rotating dice 20b, 20c, 20d, and 20e. Therefore, the left-handed spiral portion 5-L having a predetermined number of windings can be obtained by forcibly keeping sending the hanger wire 3 continuously for a constant time.

Figure 24:
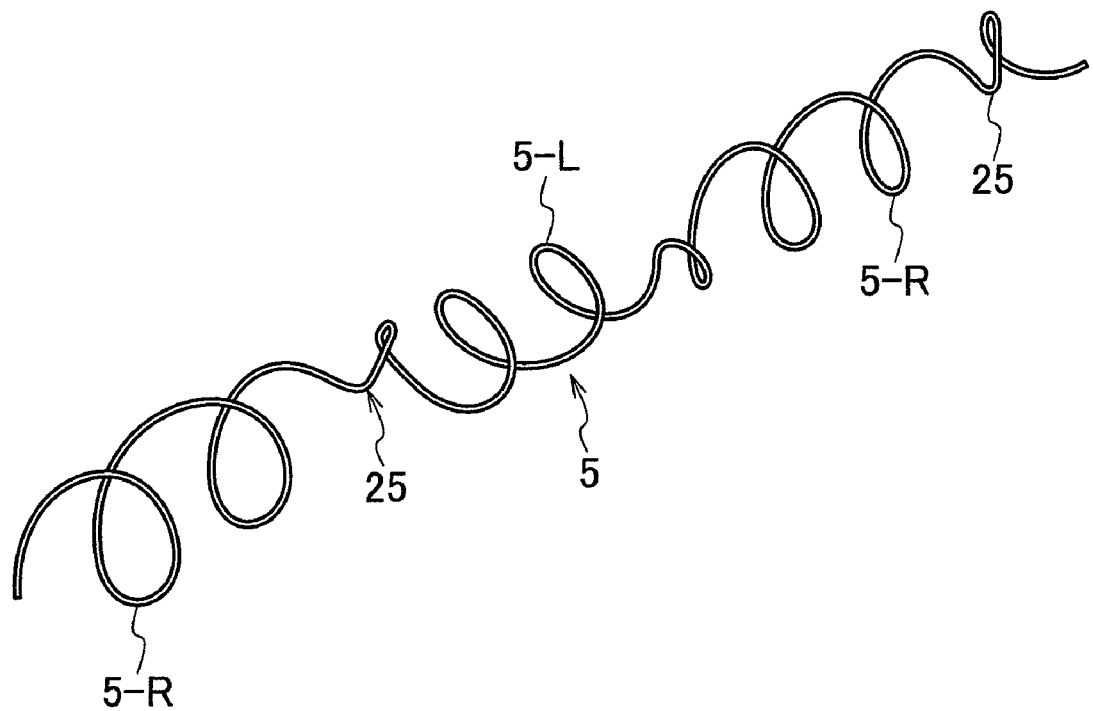
FIG. 24 is a perspective view of a cable hanger in which a Z-winding spiral and an S-winding spiral are alternately and continuously formed along an axis through the switching part.

By repeating the above operations, the cable hanger 5 in which the right-handed spiral portion 5-R and the left-handed spiral portion 5-L are alternately continued along the axial direction through the switching part (inverting part) 25 can be obtained as shown in FIG. 24.

At the time of the series of spiral forming operation, strong sliding resistance is created in the hanger wire 3 by the spiral forming guides 31 when the hanger wire 3 is sent out by the wire sending-out device 40. However, because the hanger wire 3 is guided by the wire guide 60 from the wire sending-out device 40 to the hanger wire introduction opening 26, the hanger wire 3 can smoothly be sent out reliably without being bent.

In this case, it is preferable to provide the hanger wire introduction opening 26 with an oil reservoir to reduce the sliding resistance, and to create the lubricating effect in the hanger wire 3 to reduce the insertion resistance.

According to the present invention, there is produced a cable hanger in which a Z-winding spiral and an S-winding spiral are alternately and continuously formed along an axis via a switching part using a hanger wire.

What is claimed is:

1. A cable hanger production system in which a Z-winding spiral and an S-winding spiral are alternately and continuously formed along an axis via a switching part, the cable hanger production system comprising:
a housing having a cylindrical space in which a hanger wire is supplied from one end of the housing and the hanger wire is sent out from the other end thereof; and
at least five spiral forming dice which are accommodated in the cylindrical space of the housing such that the spiral forming dice are adjacent to each other and configured to rotate independently from one another, wherein
each of second and subsequent spiral forming dice as counted from the hanger wire supplying end of the housing includes:
a bottom face forming a shape corresponding to a curvature of the Z-winding spiral and the S-winding spiral on a plane intersecting with the axis at right angles between an inner peripheral face of the housing and the bottom face, the bottom face gradually becoming narrower from both sides of the spiral forming die in its longitudinal direction toward a central portion thereof; and
a Z-winding wall face forming a shape corresponding to a pitch of the Z-winding spiral and an S-winding wall face forming a shape corresponding to a pitch of the S-winding spiral, which are inclined with respect to the plane and the axis, the Z-winding wall face and the S-winding wall face intersecting with each other at an intersection of a center of the spiral forming die in the longitudinal direction thereof, the Z-winding wall face and the S-winding wall face extending along a side edge of the bottom face, and
the first spiral forming die as counted from the hanger wire supplying end of the housing includes:
a latter half thereof in its longitudinal direction, the latter half including a bottom face, a Z-winding wall face and an S-winding wall face in the same manner as those of latter halves of the second and subsequent spiral forming dice in the longitudinal direction; and
a first half thereof in its longitudinal direction, the first half including an introducing portion extending along the axis, the introducing portion connected to a front portion of an intersection in the bottom face of the latter half in the longitudinal direction; and
a front end of the introducing portion including a hanger wire introducing inlet.

2. The cable hanger production system according to claim 1, wherein when the hanger wire is inserted, the intersections of the spiral forming dice are positioned at locations arranged along the axial direction.

3. The cable hanger production system according to claim 1, wherein when the Z-winding spiral or S-winding spiral is formed, the Z-winding wall faces or the S-winding wall faces of the spiral forming dice are sequentially positioned at locations which are connected to each other.

4. The cable hanger production system according to claim 3, wherein a positioning operation of the spiral forming dice at forming positions of the Z-winding spiral or S-winding spiral from the inserting positions of the hanger wire is carried out by simultaneously rotating the second and subsequent spiral forming dice with respect to the first spiral forming die as a reference as counted from a hanger wire supply end of the housing, and by stopping the spiral forming dice in the order from a front side.

5. The cable hanger production system according to claim 3, wherein the spiral forming dice are positioned by shifting from the forming positions of the Z-winding spiral or S-winding spiral to the forming positions of the S-winding spiral or Z-winding spiral when the switching part is formed.

6. The cable hanger production system according to claim 5, wherein position shifting operation of the spiral forming dice from the forming positions of the Z-winding spiral or S-winding spiral to the forming positions of the S-winding spiral or Z-winding spiral is carried out by simultaneously rotating the second and subsequent spiral forming dice with respect to the first spiral forming die as a reference as counted from a hanger wire supply end of the housing, and by stopping the spiral forming dice in the order from a front side.

7. The cable hanger production system according to claim 4, wherein rotation velocities of the spiral forming dice are set to such a value that each spiral forming die rotates through a rotation angle required for shifting from the forming position of the Z-winding spiral or S-winding spiral to the forming position of the S-winding spiral or Z-winding spiral while the hanger wire moves from a front end to a rear end of the spiral forming dice.

8. The cable hanger production system according to claim 1, wherein the rotation velocities of the spiral forming dice are uniform velocities.

9. The cable hanger production system according to claim 1, wherein the first spiral forming die as counted from the hanger wire supply end of the housing is fixed, and second and subsequent spiral forming dice are rotated.

10. The cable hanger production system according to claim 1, wherein the number of spiral forming dice is set to such a value that if the hanger wire passes through the first spiral forming die to the last spiral forming die, one turn of spiral of 360° is formed.

11. The cable hanger production system according to claim 2, wherein when the Z-winding spiral or S-winding spiral is formed, the Z-winding wall faces or the S-winding wall faces of the spiral forming dice are sequentially positioned at locations which are connected to each other.

12. The cable hanger production system according to claim 11, wherein a positioning operation of the spiral forming dice at forming positions of the Z-winding spiral or S-winding spiral from the inserting positions of the hanger wire is carried out by simultaneously rotating the second and subsequent spiral forming dice with respect to the first spiral forming die as a reference as counted from a hanger wire supply end of the housing, and by stopping the spiral forming dice in the order from a front side.

13. The cable hanger production system according to claim 11, wherein the spiral forming dice are positioned by shifting from the forming positions of the Z-winding spiral or S-winding spiral to the forming positions of the S-winding spiral or Z-winding spiral when the switching part is formed.

14. The cable hanger production system according to claim 13, wherein position shifting operation of the spiral forming dice from the forming positions of the Z-winding spiral or S-winding spiral to the forming positions of the S-winding spiral or Z-winding spiral is carried out by simultaneously rotating the second and subsequent spiral forming dice with respect to the first spiral forming die as a reference as counted from a hanger wire supply end of the housing, and by stopping the spiral forming dice in the order from a front side.

15. The cable hanger production system according to claim 6, wherein rotation velocities of the spiral forming dice are set to such a value that each spiral forming die rotates through a rotation angle required for shifting from the forming position of the Z-winding spiral or S-winding spiral to the forming position of the S-winding spiral or Z-winding spiral while the hanger wire moves from a front end to a rear end of the spiral forming dice.

16. The cable hanger production system according to claim 12, wherein rotation velocities of the spiral forming dice are set to such a value that each spiral forming die rotates through a rotation angle required for shifting from the forming position of the Z-winding spiral or S-winding spiral to the forming position of the S-winding spiral or Z-winding spiral while the hanger wire moves from a front end to a rear end of the spiral forming dice.

17. The cable hanger production system according to claim 14, wherein rotation velocities of the spiral forming dice are set to such a value that each spiral forming die rotates through a rotation angle required for shifting from the forming position of the Z-winding spiral or S-winding spiral to the forming position of the S-winding spiral or Z-winding spiral while the hanger wire moves from a front end to a rear end of the spiral forming dice.

18. The cable hanger production system according to claim 4, wherein the rotation velocities of the spiral forming dice are uniform velocities.

19. The cable hanger production system according to claim 12, wherein the rotation velocities of the spiral forming dice are uniform velocities.

20. The cable hanger production system according to claim 6, wherein the rotation velocities of the spiral forming dice are uniform velocities.

21. The cable hanger production system according to claim 14, wherein the rotation velocities of the spiral forming dice are uniform velocities.

22. The cable hanger production system according to claim 7, wherein the rotation velocities of the spiral forming dice are uniform velocities.

23. The cable hanger production system according to claim 15, wherein the rotation velocities of the spiral forming dice are uniform velocities.

24. The cable hanger production system according to claim 16, wherein the rotation velocities of the spiral forming dice are uniform velocities.

25. The cable hanger production system according to claim 17, wherein the rotation velocities of the spiral forming dice are uniform velocities.

26. A cable hanger production system in which a Z-winding spiral and an S-winding spiral are alternately and continuously formed along an axis via a switching part, comprising
a wire processing device including
a housing having a cylindrical space in which a hanger wire is supplied from one end of the housing and the hanger wire is sent out from the other end thereof, and
at least five spiral forming dice which are accommodated in the cylindrical space of the housing in adjacent to one another such that the spiral forming dice can be rotated by a motor independently from each other; and
a wire supply device which is disposed in front of the wire processing device for supplying the hanger wire toward the one end of the wire processing device; wherein
the spiral forming dice are positioned by shifting from positions for forming the Z-winding spiral or S-winding spiral to positions for forming the S-winding spiral or Z-winding spiral by simultaneously rotating second and subsequent spiral forming dice with respect to the first spiral forming die as a reference as counted from the one end of the wire processing device, and by stopping the spiral forming dice in the order from a front side; and
rotation velocities of the spiral forming dice by the motor are set to such a value that the each spiral forming die rotates through a rotation angle required for shifting from the forming position of the Z-winding spiral or S-winding spiral to the forming position of the S-winding spiral or Z-winding spiral while the hanger wire supplied by the wire supply device moves from a front end to a rear end of the spiral forming dice.

27. A production method for forming a cable hanger in which a Z-winding spiral and an S-winding spiral are alternately and continuously formed along an axis via a switching part, wherein
a hanger wire is supplied from one end of a housing and sent out from the other end thereof, at least five spiral forming dice are accommodated in a cylindrical space of the housing such that the spiral forming dice are adjacent to each other and they can rotate independently from each other, the spiral forming dice are used,
each of second and subsequent spiral forming dice as counted from the hanger wire supplying end of the housing includes:
a bottom face forming a shape corresponding to a curvature of the Z-winding spiral and the S-winding spiral on a plane intersecting with the axis at right angles between an inner peripheral face of the housing and the bottom face, the bottom face gradually becoming narrower from both sides of the spiral forming die in its longitudinal direction toward a central portion thereof; and
a Z-winding wall face forming a shape corresponding to a pitch of the Z-winding spiral and an S-winding wall face forming a shape corresponding to a pitch of the S-winding spiral, which are inclined with respect to the plane and the axis, the Z-winding wall face and the S-winding wall face intersecting with each other at an intersection of a center of the spiral forming die in the longitudinal direction thereof, the Z-winding wall face and the S-winding wall face extending along a side edge of the bottom face,
the first spiral forming die as counted from the hanger wire supplying end of the housing includes:
a latter half thereof in its longitudinal direction, the latter half including a bottom face, a Z-winding wall face and an S-winding wall face in the same manner as those of latter halves of the second and subsequent spiral forming dice in the longitudinal direction;
a first half thereof in its longitudinal direction, the first half including an introducing portion extending along the axis, the introducing portion connected to a front portion of an intersection in the bottom face of the latter half in the longitudinal direction; and
a front end of the introducing portion including a hanger wire introducing inlet, and
in the method:
after a first step of inserting the hanger wire along the intersections into the spiral forming dice positioned at locations where the intersections are arranged along the axial direction is performed, the hanger wire is supplied from the one end and in this state; and
second to fifth steps are repeated by predetermined times;
the second step of positioning the spiral forming dice at locations where the Z-winding wall faces or the S-winding wall faces are sequentially connected to each other;
the third step of keeping the spiral forming dice in their positioned state and for forming the Z-winding spiral or the S-winding spiral having a predetermined number of windings;

the fourth step of position shifting the spiral forming dice to locations where the S-winding wall faces or the Z-winding wall faces are sequentially connected to each other; and the fifth step of keeping the spiral forming dice in their positioned state and for forming the S-winding spiral or the Z-winding spiral having a predetermined number of windings.

28. The cable hanger production method according to claim 27, wherein the second step and the fourth step are carried out by simultaneously rotating second and subsequent spiral forming dice with respect to the first spiral forming die as a reference as counted from a hanger wire supply end of the housing, and by stopping the spiral forming dice in the order from a front side.

* * * * *